(12) United States Patent
Matos et al.

(10) Patent No.: US 11,961,356 B2
(45) Date of Patent: *Apr. 16, 2024

(54) GAMING DEVICE WITH VARIABLE SYMBOL REPLACEMENT

(71) Applicant: Aristocrat Technologies Australia Pty Limited, North Ryde (AU)

(72) Inventors: Joshua Matos, Cordeaux Heights (AU); James Loader, Springfield (AU); Antoon Visser, Coogee (AU); Karen Kendall, Toongabbie (AU)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 0 days.

This patent is subject to a terminal disclaimer.

(21) Appl. No.: 18/114,714

(22) Filed: Feb. 27, 2023

(65) Prior Publication Data

US 2023/0222864 A1 Jul. 13, 2023

Related U.S. Application Data

(63) Continuation of application No. 17/145,113, filed on Jan. 8, 2021, now Pat. No. 11,594,098.

(30) Foreign Application Priority Data

Mar. 20, 2020 (AU) ................................ 2020900853
Sep. 29, 2020 (AU) ................................ 2020244444

(51) Int. Cl.
*G07F 17/32* (2006.01)
*G06F 7/58* (2006.01)

(52) U.S. Cl.
CPC .......... *G07F 17/3213* (2013.01); *G06F 7/588* (2013.01); *G07F 17/3227* (2013.01); *G07F 17/326* (2013.01); *G07F 17/3267* (2013.01)

(58) Field of Classification Search
CPC .. G07F 17/3213; G07F 17/3267; G07F 17/34; G07F 17/3258; G07F 17/3265;
(Continued)

(56) References Cited

U.S. PATENT DOCUMENTS

D264,099 S 4/1982 Hanzawa
D321,377 S 11/1991 Ko
(Continued)

OTHER PUBLICATIONS

Office Action (Non-Final Rejection) dated Jan. 14, 2022 for U.S. Appl. No. 17/145,113 (pp. 1-12).
(Continued)

*Primary Examiner* — Justin L Myhr
(74) *Attorney, Agent, or Firm* — McAndrews, Held & Malloy, Ltd.

(57) ABSTRACT

A gaming device having a processor that selects symbols from a first set of reel strips for a plurality of columns of symbol positions, and from a second set of reel strips for a plurality of columns of symbol positions, and controls a display to display the symbols selected including displaying, at each symbol position for which a defined symbol is selected, the defined symbol with the symbol selected at a respective symbol position. Upon the symbols selected including a qualifier symbol, the processor randomly selects one of at least two different symbol replacements, and determines, using the symbol replacements, a replacement symbol for the defined symbol selected. The processor updates the plurality of symbols to incorporate the replacement symbol, and evaluates the updated plurality of symbols for winning symbol combinations.

20 Claims, 20 Drawing Sheets

(58) Field of Classification Search
CPC ............. G07F 17/3209; G07F 17/3244; G07F 17/326; G06F 7/588
See application file for complete search history.

(56) References Cited

U.S. PATENT DOCUMENTS

| | | |
|---|---|---|
| 6,604,740 B1 | 8/2003 | Singer |
| D803,323 S | 11/2017 | Bussey |
| D907,716 S | 1/2021 | Demarco |
| D910,118 S | 2/2021 | Demarco |
| D910,120 S | 2/2021 | Demarco |
| D938,972 S | 12/2021 | Boese |
| D952,646 S | 5/2022 | Ludwick |
| D968,516 S | 11/2022 | Mcgahn |
| D969,224 S | 11/2022 | Francisco |
| D974,481 S | 1/2023 | Ocampo |
| 2011/0244942 A1 | 10/2011 | Aoki |
| 2013/0102377 A1 | 4/2013 | Ballone |
| 2015/0080088 A1 | 3/2015 | Smalley |
| 2015/0348374 A1 | 12/2015 | Dupuis |
| 2017/0061744 A1 | 3/2017 | Kisenwether |
| 2017/0200345 A1 | 7/2017 | Fujisawa |
| 2019/0051114 A1 | 2/2019 | Cong |

OTHER PUBLICATIONS

Office Action dated Feb. 16, 2023 for U.S. Appl. No. 29/747,252 (pp. 1-6).
Office Action (Final Rejection) dated Jul. 21, 2022 for U.S. Appl. No. 17/145,113 (pp. 1-12).
Office Action (Notice of Allowance and Fees Due (PTOL-85)) dated Nov. 9, 2022 for U.S. Appl. No. 17/145,113 (pp. 1-8).

| Reel strip position | Reel 1 | Reel 2 | Reel 3 | Reel 4 | Reel 5 |
|---|---|---|---|---|---|
| 1 | Pic 1 | 10 | Pic 3 | Q | Pic 1 |
| 2 | K | Q | K | A | 10 |
| 3 | J | K | 10 | 10 | A |
| 4 | Scat | Pic 1 | Pic 2 | Scat | Wild |
| 5 | Q | A | Q | Pic 2 | Pic 2 |
| 6 | 10 | Pic 2 | K | J | A |
| 7 | Q | Pic 4 | K | Pic 1 | Q |
| 8 | Pic 2 | J | Wild | K | Pic 3 |
| 9 | A | Q | 10 | Q | 9 |
| 10 | 9 | A | Pic 1 | K | J |
| 11 | Pic 3 | Pic 3 | 9 | Pic 4 | A |
| 12 | 10 | 9 | Pic 3 | Pic 1 | Qualifier |
| 13 | Scat | K | A | Q | K |
| 14 | Pic 3 | 9 | Q | Pic 4 | Pic 4 |
| 15 | K | Scat | J | Pic 2 | 9 |
| 16 | K | 10 | 10 | 9 | Scat |
| 17 | J | Wild | 10 | A | K |
| 18 | Pic 4 | Pic 2 | Scat | A | Pic 1 |
| 19 | Pic 4 | Q | Pic 2 | 10 | Pic 1 |
| 20 | Pic 1 | Q | J | K | 9 |
| 21 | 10 | Pic 3 | Pic 3 | Pic 3 | K |
| 22 | J | J | Pic 4 | Pic 3 | Pic 2 |
| 23 | Pic 3 | K | K | 10 | Q |
| 24 | 9 | 9 | 10 | J | K |
| 25 | Pic 4 | Pic 3 | 9 | Pic 1 | Pic 3 |
| 26 | A | Pic 4 | 9 | 9 | Pic 4 |
| 27 | 10 | Scat | Q | 10 | Pic 4 |
| 28 | Pic 4 | K | Pic 2 | Wild | 10 |
| 29 | 9 | 10 | J | Q | Pic 2 |
| 30 | Q | Q | Pic 4 | K | J |

*FIG. 3*

GAMING DEVICE WITH VARIABLE SYMBOL REPLACEMENT

RELATED APPLICATIONS

The present application is a continuation of and claims priority to U.S. patent application Ser. No. 17/145,113, filed Jan. 8, 2021, issued on Feb. 28, 2023, as U.S. Pat. No. 11,594,098, and entitled "Gaming Device with Variable Symbol Replacement" which claims priority to Australian Patent Application No. AU 2020900853, filed Mar. 20, 2020, and Australian Patent Application No. 2020244444, filed Sep. 29, 2020, all of which are hereby incorporated by reference in their entireties.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In many games, a player may qualify for secondary games or bonus rounds by attaining a certain winning combination or triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player (RTP=return to player) over the course of many plays or instances of the game. The RTP and randomness of the RNG are critical to ensuring the fairness of the games and are therefore highly regulated. Upon initiation of play, the RNG randomly determines a game outcome and symbols are then selected which correspond to that outcome. Notably, some games may include an element of skill on the part of the player and are therefore not entirely random.

SUMMARY

Example implementations relate to a gaming device, a method of operating a gaming device a system where when a replacement condition is met, such as the landing of a combination of background symbols and a qualifier symbol, a symbol replacement mechanism is selected, for example, randomly. Symbols at the symbol positions where the background symbols land are replaced using the selected mechanism. This enables the replacement symbol to vary. In some implementations, the replacement mechanism is selected by the player when a series of free games triggers.

In an example embodiment, there is provided a gaming device comprising a display, a processor, and a memory storing reel strip data defining a plurality of reel strips and instructions. When the instructions are executed, they cause the processor to select symbols from a first set of reel strips defined by said reel strip data for respective ones of a plurality of columns of symbol positions, the first set of reel strips including at least one reel strip comprising a qualifier symbol, select symbols from a second set of reel strips defined by said reel strip data for at least subset of the plurality of columns of symbol positions, the second set of reel strips each comprising defined symbols at a subset of reel strip positions of the respective reel strips, and control the display to display the selected symbols of the first and second sets of reel strips at the plurality of columns of symbol positions including by displaying, at each symbol position for which a defined symbol is selected, the defined symbol in conjunction with the symbol selected for the respective symbol position from the first set of reel strips. Upon the symbols selected from the first set of reel strips including the qualifier symbol, the instructions cause the processor to randomly select one of at least two different symbol replacement mechanisms and determine, using the randomly selected replacement mechanism, a replacement symbol for each symbol position for which the defined symbol was selected. The processor then controls the display to update the display of symbols in the plurality of columns of symbol positions to incorporate each replacement symbol, and evaluates the updated display of symbols for winning symbol combinations.

In another example embodiment, there is provided a method of operating a gaming device comprising a display and a memory storing reel strip data defining a plurality of reel strips. The method comprises selecting symbols from a first set of reel strips defined by said reel strip data for respective ones of a plurality of columns of symbol positions, the first set of reel strips including at least one reel strip comprising a qualifier symbol, selecting symbols from a second set of reel strips defined by said reel strip data for at least subset of the plurality of columns of symbol positions, the second set of reel strips each comprising defined symbols at a subset of reel strip positions of the respective reel strips, and controlling the display to display the selected symbols of the first and second sets of reel strips at the plurality of columns of symbol positions including by displaying, at each symbol position for which a defined symbol is selected, the defined symbol in conjunction with the symbol selected for the respective symbol position from the first set of reel strips. Upon the symbols selected from the first set of reel strips including the qualifier symbol, the method comprises randomly selecting one of at least two different symbol replacement mechanisms and determining, using the randomly selected replacement mechanism, a replacement symbol for each symbol position for which the defined symbol was selected. The example method further comprises controlling the display to update the display of symbols in the plurality of columns of symbol positions to incorporate each replacement symbol, and evaluating the updated display of symbols for winning symbol combinations.

In another example embodiment, there is provided a system comprising one or more processors, and at least one memory storing reel strip data defining a plurality of reel strips and instructions which when executed cause the one or more processors to When the instructions are executed, they cause the one or more processors to select symbols from a first set of reel strips defined by said reel strip data for respective ones of a plurality of columns of symbol positions, the first set of reel strips including at least one reel strip comprising a qualifier symbol, select symbols from a second set of reel strips defined by said reel strip data for at least subset of the plurality of columns of symbol positions, the second set of reel strips each comprising defined symbols at a subset of reel strip positions of the respective reel strips, and control the display to display the selected symbols of the first and second sets of reel strips at the plurality of columns of symbol positions including by displaying, at each symbol position for which a defined symbol is selected, the defined symbol in conjunction with the symbol selected for the respective symbol position from the first set of reel strips. Upon the symbols selected from the first set of reel strips including the qualifier symbol, the instructions cause the one or more processors to randomly select one of at least two different symbol replacement mechanisms and determine, using the randomly selected replacement mechanism, a replacement symbol for each symbol position for which the defined symbol was selected. The one or more processors then controls the display to update the display of symbols in the plurality of columns of symbol positions to incorporate each replacement symbol, and evaluates the updated display of symbols for winning symbol combinations.

BRIEF DESCRIPTION OF THE DRAWINGS

FIG. 3 illustrates an example reel strip layout.

DETAILED DESCRIPTION

Embodiments of the present disclosure represent a technical improvement in the art of electronic gaming machines, systems, and operating for such electronic gaming machines or systems. For example, at least some embodiments of the present disclosure employ a display that provides a random selection of one or more visual transformations of game characteristics. In such embodiments, a plurality of symbols are randomly selected for animated display at a plurality of symbol positions during a base game. Concurrently or subsequently, one or more backgrounds for the plurality of symbol positions are randomly selected. When the plurality of symbols selected include one or more special symbols, the gaming machine uses a randomly selected replacement mechanics to animate a replacement of one or more symbols that have the randomly selected backgrounds to generate an outcome, and evaluates the outcomes based on the plurality of symbols with the replacements.

Further, the visual addition of one or more backgrounds and the visual transformation of symbols with the selected backgrounds also provide an improved electronic game machine display such that the player may need to direct attention to symbols being displayed and differently backgrounded, and visually animated to transform to obtain a better outcome, without being overly burdened by complicated calculations. Further, embodiments of the present disclosure also provide multiple visual background transformation opportunities in both base games and feature games are not conventional. Thus, embodiments of the present disclosure are not merely new game rules or simply new display patterns, but provide technologic improvements to game display in the art of electronic gaming machines and software for such electronic gaming machines. Moreover, the above example is not intended to be limiting, but merely exemplary of technologic improvements provided by some embodiments of the present disclosure. Technological improvements of other embodiments are readily apparent to those of ordinary skill in the art in light of the present disclosure.

Figure 1:
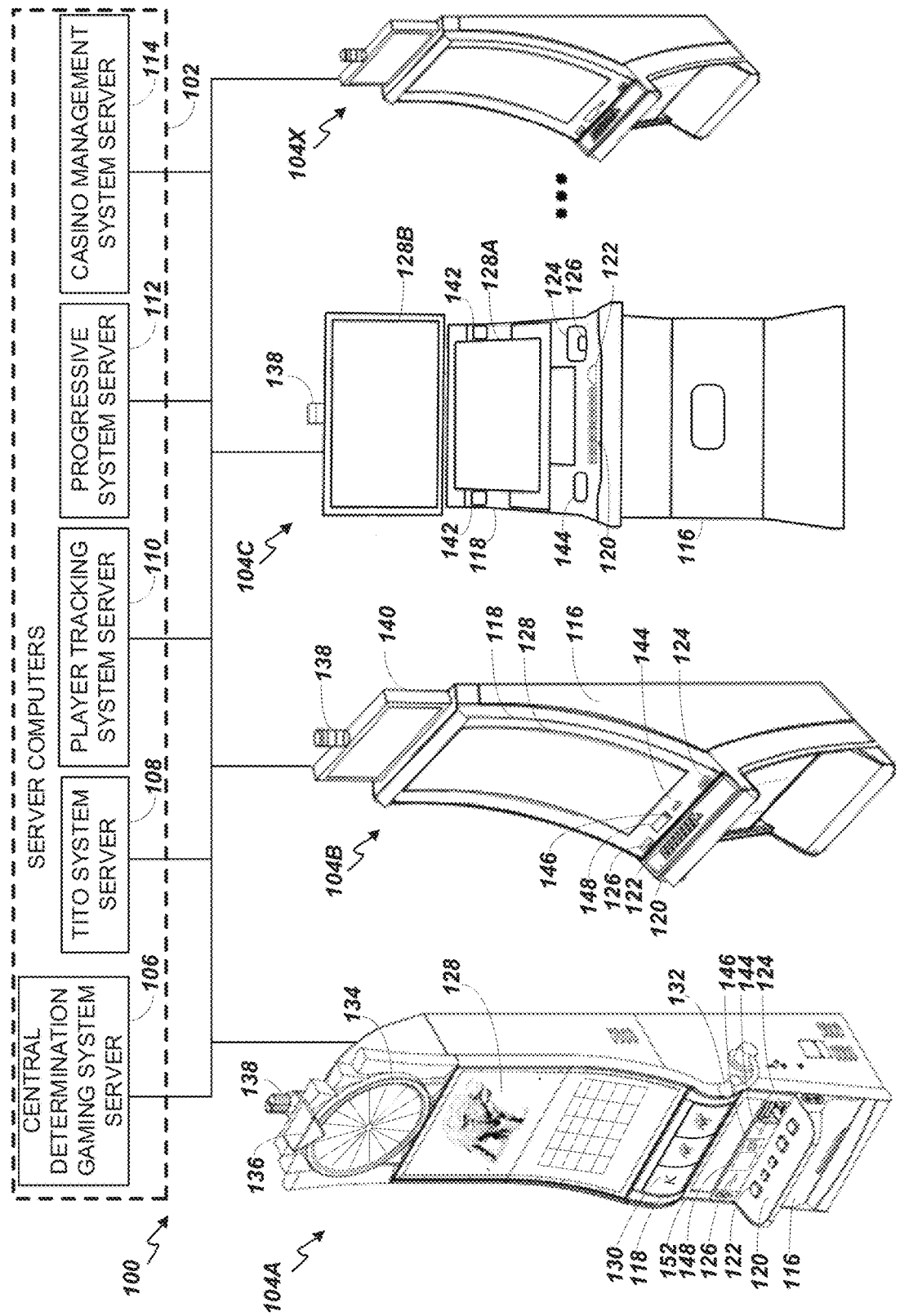
FIG. 1 is an exemplary diagram showing several EGMs networked with various gaming related servers.

FIG. 1 illustrates several different models of EGMs which may be networked to various gaming related servers. The present invention can be configured to work as a system 100 in a gaming environment including one or more server computers 102 (e.g., slot servers of a casino) that are in communication, via a communications network, with one or more gaming devices 104A-104X (EGMs, slots, video poker, bingo machines, etc.). The gaming devices 104A-104X may alternatively be portable and/or remote gaming devices such as, but not limited to, a smart phone, a tablet, a laptop, or a game console.

Communication between the gaming devices 104A-104X and the server computers 102, and among the gaming devices 104A-104X, may be direct or indirect, such as over the Internet through a website maintained by a computer on a remote server or over an online data network including commercial online service providers, Internet service providers, private networks, and the like. In other embodiments, the gaming devices 104A-104X may communicate with one another and/or the server computers 102 over RF, cable TV, satellite links and the like.

In some embodiments, server computers 102 may not be necessary and/or preferred. For example, the present invention may, in one or more embodiments, be practiced on a stand-alone gaming device such as gaming device 104A, gaming device 104B or any of the other gaming devices 104C-104X. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door 116 which provides access to the interior of the cabinet. Gaming device 104A typically includes a button area or button deck 120 accessible by a player that is configured with input switches or buttons 122, an access channel for a bill validator 124, and/or an access channel for a ticket printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The reels 130 are independently spun and stopped to show a set of symbols within the gaming display area 118 which may be used to determine an outcome to the game. In embodiments where the reels are mechanical, mechanisms can be employed to implement greater functionality. For example, the boundaries of the gaming display area boundaries of the gaming display area 118 may be defined by one or more mechanical shutters controllable by a processor. The mechanical shutters may be controlled to open and close, to correspondingly reveal and conceal more or fewer symbol positions from the mechanical reels 130. For example, a top boundary of the gaming display area 118 may be raised by moving a corresponding mechanical shutter upwards to reveal an additional row of symbol positions on stopped mechanical reels. Further, a transparent or translucent display panel may be overlaid on the gaming display area 118 and controlled to override or supplement what is displayed on one or more of the mechanical reel(s).

In many configurations, the gaming machine 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor.

In some embodiments, the bill validator 124 may also function as a "ticket-in" reader that allows the player to use a casino issued credit ticket to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are well known in the art and are used to generate and track unique bar-codes or other indicators printed on tickets to allow players to avoid the use of bills and coins by loading credits using a ticket reader and cashing out credits using a ticket-out printer 126 on the gaming device 104A. In some embodiments a ticket reader can be used which is only capable of reading tickets. In some embodiments, a different form of token can be used to store a cash value, such as a magnetic stripe card.

In some embodiments, a player tracking card reader 144, a transceiver for wireless communication with a player's smartphone, a keypad 146, and/or an illuminated display 148 for reading, receiving, entering, and/or displaying player tracking information is provided in EGM 104A. In such embodiments, a game controller within the gaming device 104A can communicate with the player tracking server system 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Figure 2:
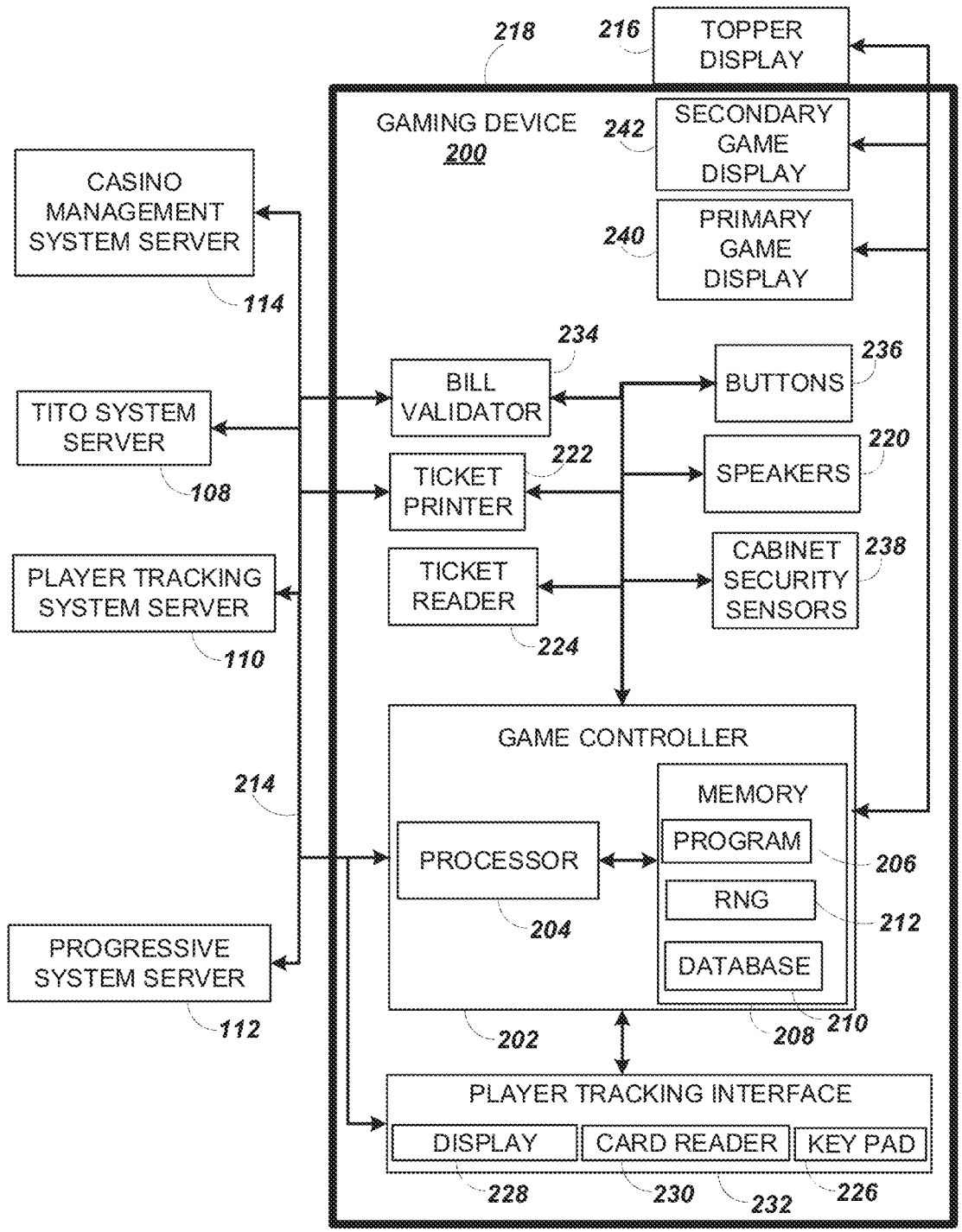
FIG. 2 is a block diagram showing various functional elements of an exemplary EGM.

Many or all the above described components can be controlled by circuitry (e.g., a gaming controller) housed inside the main cabinet 116 of the gaming device 104A, the details of which are shown in FIG. 2.

Note that not all gaming devices suitable for implementing embodiments of the present invention necessarily include top wheels, top boxes, information panels, cashless ticket systems, and/or player tracking systems. Further, some suitable gaming devices have only a single game display that includes only a mechanical set of reels and/or a video display, while others are designed for bar counters or table tops and have displays that face upwards.

An alternative example gaming device 104B illustrated in FIG. 1 is the Arc™ model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main door 118 which opens to provide access to the interior of the gaming device 104B. The main or service door 118 is typically used by service personnel to refill the ticket-out printer 126 and collect bills and tickets inserted into the bill validator 124. The door 118 may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 128B is typically used for bonus game play, to show game features or attraction activities while the game is not in play or any other information or media desired by the game designer or operator.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2 is a block diagram depicting exemplary internal electronic components of a gaming device 200 connected to various external systems. All or parts of the example gaming device 200 shown could be used to implement any one of the example gaming devices 104A-X depicted in FIG. 1. The games available for play on the gaming device 200 are controlled by a game controller 202 that includes one or more processors 204 and a game that may be stored as game software or a program 206 in a memory 208 coupled to the processor 204. The memory 208 may include one or more mass storage devices or media that are housed within gaming device 200. Within the mass storage devices and/or memory 208, one or more databases 210 may be provided for use by the program 206. A random number generator (RNG) 212 that can be implemented in hardware and/or software is typically used to generate random numbers that are used in the operation of game play to ensure that game play outcomes are random and meet regulations for a game of chance. In some embodiments, the random number generator 212 is a pseudo-random number generator.

Alternatively, a game instance (i.e. a play or round of the game) may be generated on a remote gaming device such as a central determination gaming system server 106 (not shown in FIG. 2 but see FIG. 1). The game instance is communicated to gaming device 200 via the network 214 and then displayed on gaming device 200. Gaming device 200 may execute game software, such as but not limited to video streaming software that allows the game to be displayed on gaming device 200. When a game is stored on gaming device 200, it may be loaded from a memory 208 (e.g., from a read only memory (ROM)) or from the central determination gaming system server 106 to memory 208. The memory 208 may include RAM, ROM or another form of storage media that stores instructions for execution by the processor 204.

The gaming device 200 may include a topper display 216 or another form of a top box (e.g., a topper wheel, a topper screen, etc.) which sits above main cabinet 218. The gaming cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. The player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. Ticket printer 222 may be used to print tickets for a TITO system server 108. The gaming device 200 may further include a bill validator 234, buttons 236 for player input, cabinet security sensors 238 to detect unauthorized opening of the cabinet 218, a primary game display 240, and a secondary game display 242, each coupled to and operable under the control of game controller 202.

Gaming device 200 may be connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

Gaming devices, such as gaming devices 104A-104X, 200, are highly regulated to ensure fairness and, in many cases, gaming devices 104A-104X, 200 are operable to award monetary awards (e.g., typically dispensed in the form of a redeemable voucher). Therefore, to satisfy security and regulatory requirements in a gaming environment, hardware and software architectures are implemented in gaming devices 104A-104X, 200 that differ significantly from those of general-purpose computers. Adapting general purpose computers to function as gaming devices 200 is not simple or straightforward because of: 1) the regulatory requirements for gaming devices 200, 2) the harsh environment in which gaming devices 200 operate, 3) security requirements, 4) fault tolerance requirements, and 5) the requirement for additional special purpose componentry enabling functionality of an EGM. These differences require substantial engineering effort with respect to game design implementation, hardware components and software.

When a player wishes to play the gaming device 200, he/she can insert cash or a ticket voucher through a coin acceptor (not shown) or bill validator 234 to establish a credit balance on the gamine machine. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views the game outcome on the game displays 240, 242. Other game and prize information may also be displayed.

When the player is done, he/she cashes out the credit balance (typically by pressing a cash out button to receive a ticket from the ticket printer 222). The ticket may be "cashed-in" for money or inserted into another machine to establish a credit balance for play.

Figure 5:
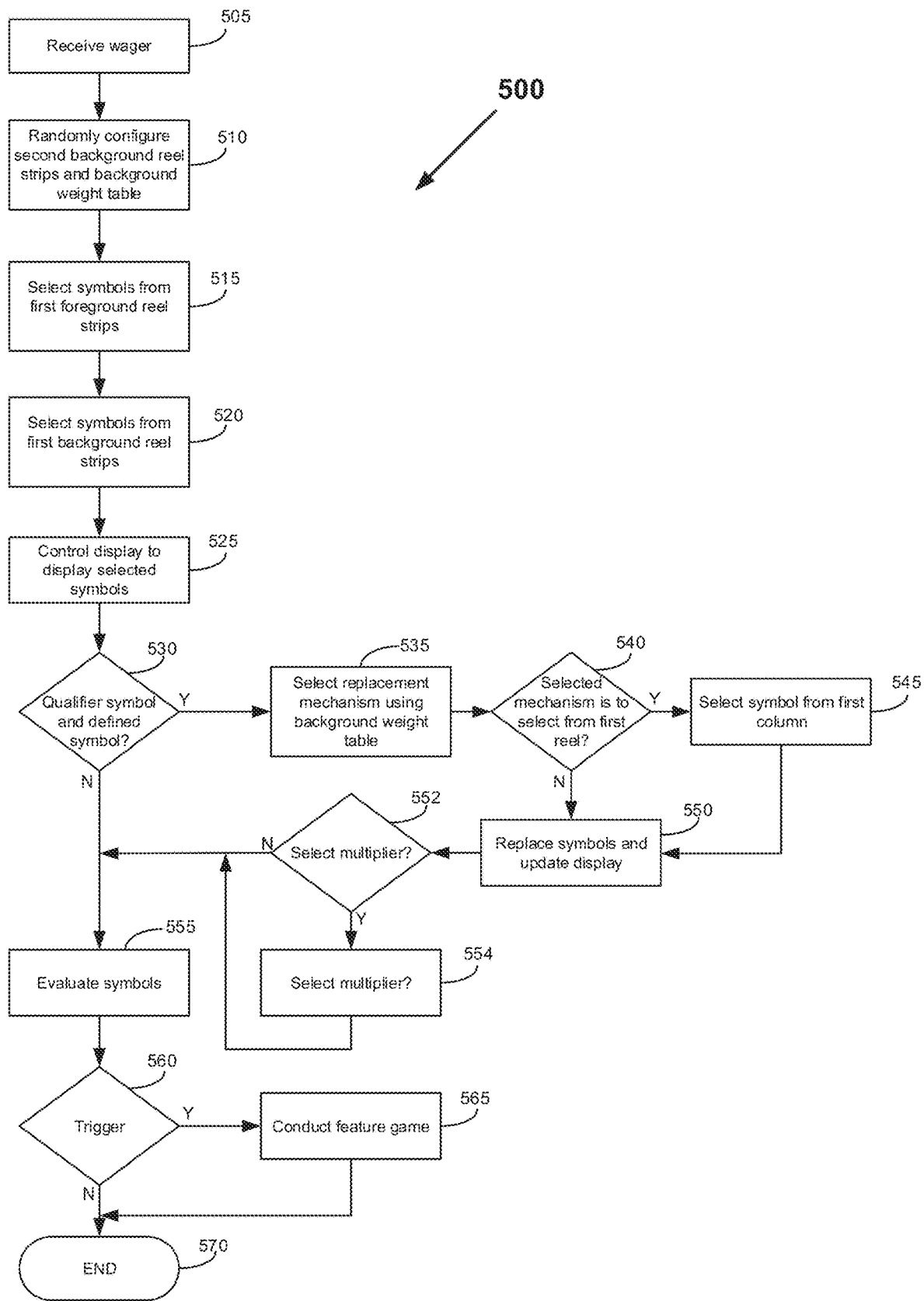
FIG. 5 is a flow chart of a method of operating a gaming device.

FIG. 5 illustrates an example method 500 of operating a gaming device. At step 505, the processor receives a wager (e.g. in response to player pressing a button as described above) and initiates a game instance.

At step 510, the processor configures (a) the reel strips to be used for as a second set of reel strips or "background reel strips" as well as (b) a background weight table that determines a symbol replacement mechanism. In this example, this is achieved by randomly selecting one of a plurality of "patterns". Each pattern defines how many of a defined, "BACKGROUND" symbols will be on each of the second, third and fourth reel strips, where the "BACKGROUND" symbols will appear on the fifth reel, and a background weight table to use to determine the symbol replacement mechanism to use when a "QUALIFIER" symbol lands as explained in further detail below. Using a pattern allows additional control over return to player than independently selecting the reel strips and the background weight table, however, in other examples, they may be selected independently.

Figure 7:
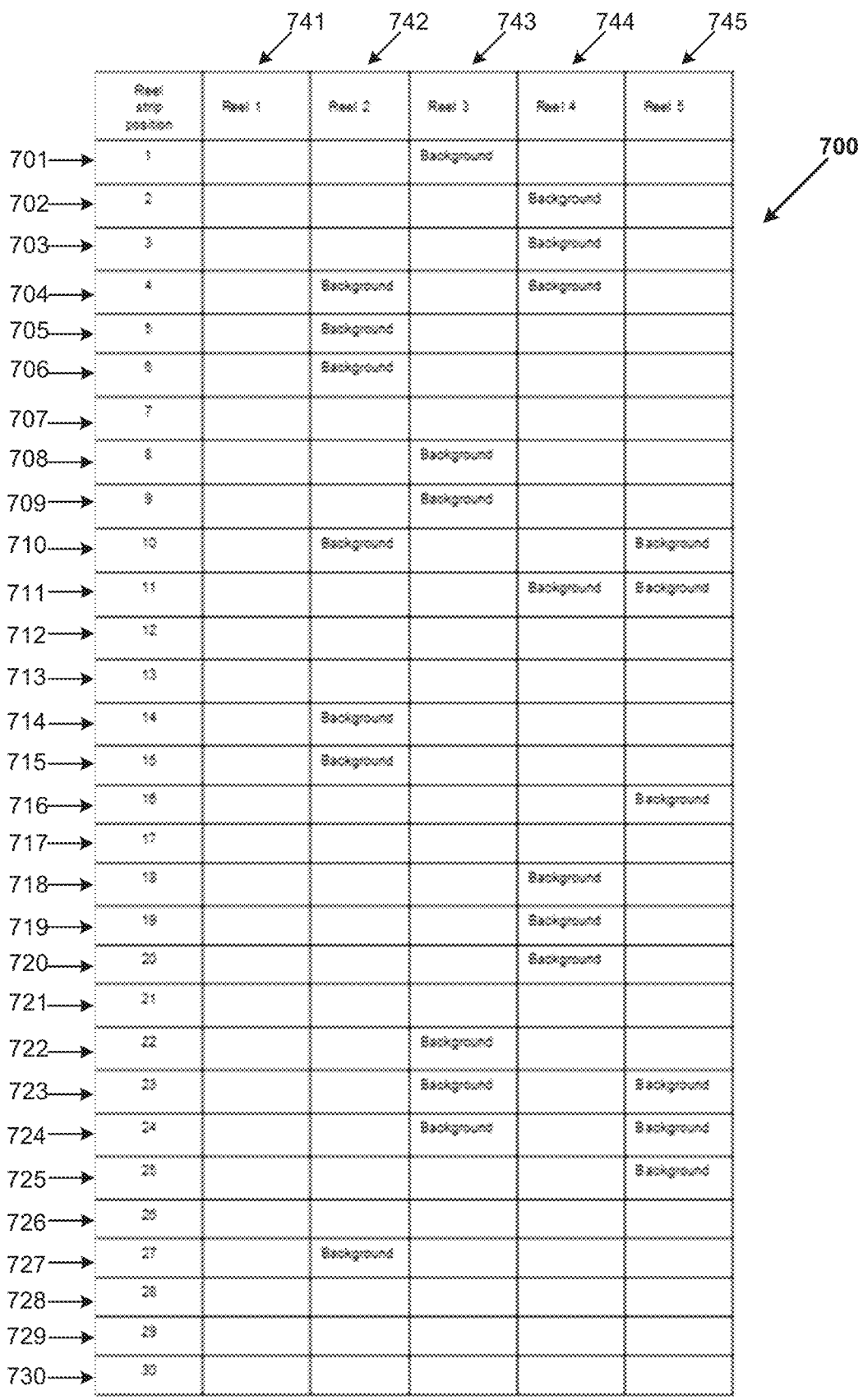
FIG. 7 illustrates an example reel strip layout for background reel strips.

FIG. 7 illustrates an example of a configured set of background or "ghost" reel strips where reel strip positions 701-730 of second to fourth reel strips are either occupied by defined symbol (here the BACKGROUND symbol) or are blank symbols. All of the reel strip positions of the first reel strip are blank to signify that in this example, symbols are not selected from the first reel strip for reasons which will become apparent from the following description.

Further, while in this example, the defined symbols are described as BACKGROUND symbols, this is linked to the graphical representation of the outcomes operation of the gaming device as described above and in other examples, the second reel strips could be overlay reel strips. For example, in the example screen displays below the BACKGROUND symbols are FIRECRACKER symbols which are suited to being displayed behind the symbols of the first, foreground reel strips as an animation of the are FIRECRACKER symbols exploding can be incorporated into display of symbols being replaced as will be described below. However, other examples can enable the game play by enabling a defined symbol to be independently selected which has a form that enables it to be displayed in conjunction with the symbol selected for the respective symbol position from the first set of reel strips without making the other symbols unclear. For example, in the case of overlay reel strips, the defined symbol could be a frame that would be displayed around the first symbols from the first reel strips.

At step 515, the processor 204 selects a symbol from a first, foreground set of reel strips.

FIG. 3 illustrates an example of a first, foreground set 300 of five reel strips 341, 342, 343, 344, 345. In the example, each reel strip has thirty reel strip positions 301-330. Each reel strip position of each reel has a symbol. For example, a "WILD" symbol 331 occupies the twenty-eighth reel strip position 328 of the fourth reel 344. Other reels strips to those illustrated in FIG. 3 can be used, for example, reel strips where two or more wild symbols are placed at consecutive reel strip positions of a reel strip. In other examples, the reel strips could have between 30 and 100 reel strip positions. The actual lengths of the game reel strips depend on factors such as the number of wild symbols (in general, the more wilds there are, the longer the reel strip needs to be to maintain the target RTP), and volatility (in general, the higher the prize value is, the longer the reel strip needs to be to lower the hit rate to maintain the target RTP). In this example a single "QUALIFIER" symbol 332 is on the fifth reel strip. In other examples, there may be more than one QUALIFIER symbol on the fifth reel strip and/or the QUALIFIER symbol may be on more than one reel strip or a different reel strip. In alternative examples, the QUALIFIER symbol may be on the background reel strip rather than the fifth reel strip. The description herein refers to implementations on the fifth reel strip but, with minor modifications, is also applicable to implementations the background reel strip.

Figure 4:
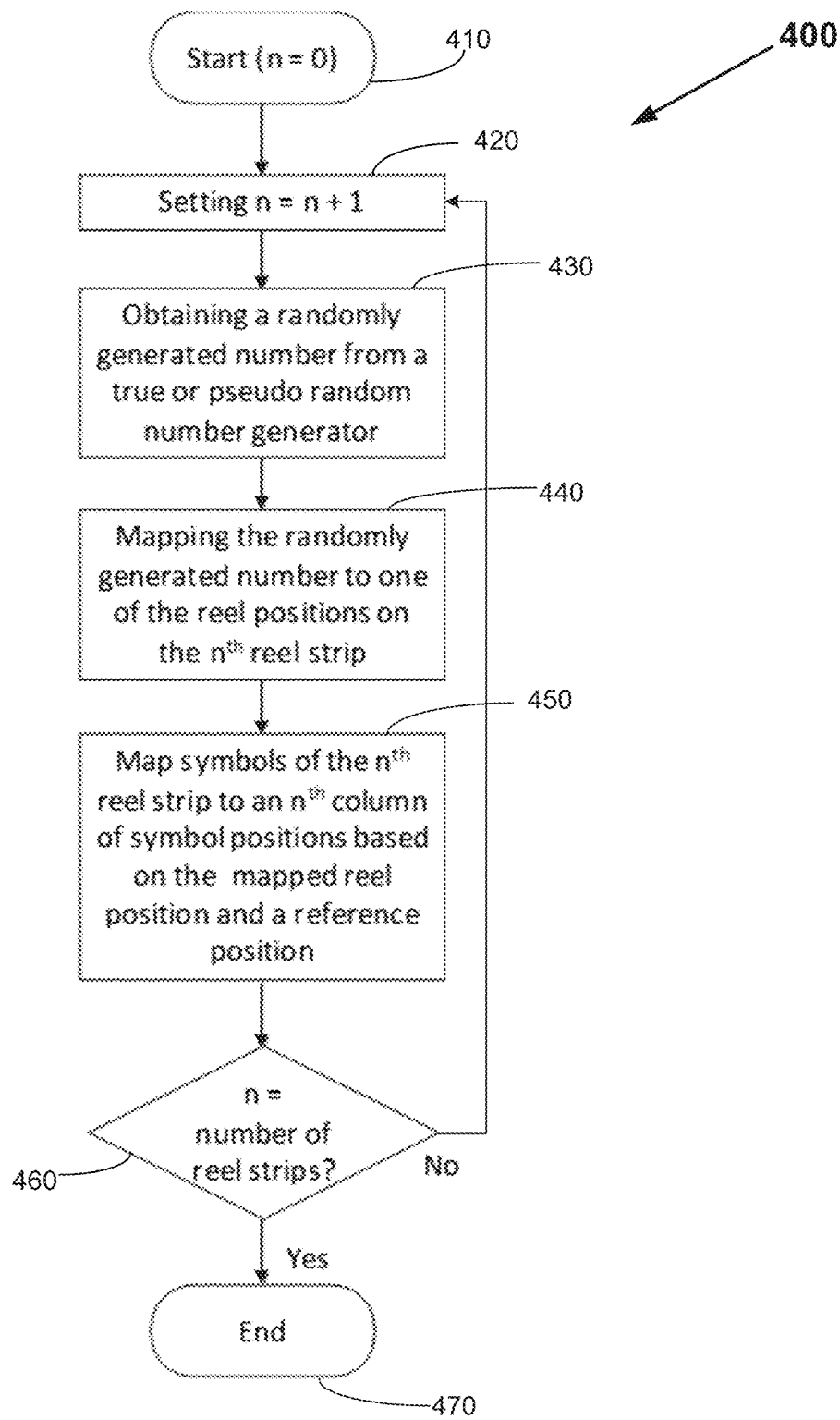
FIG. 4 is a flow chart of a symbol selection method.

FIG. 4 is a flow chart of a method 400 carried out by the processor 204 to select symbols from reel strips 341. At step 410, the processor 204 starts the process of selecting symbols with a counter (n) set at zero as symbols have not yet been selected from any reel strips. At step 420, the processor 204 increments the counter. In the first iteration, the counter is set to 1 to reflect that symbols are to be selected from a first reel strip. At step 430, the processor obtains a randomly generated number from a true or pseudo random number generator 212. At step 440 the processor maps the generated number to one of the reel positions of the nth reel strip. In the first iteration, this is the first reel strip. To map the generated number to one of the reel positions, the possible values that can be returned from the RNG 212 are divided into ranges and associated with specific ones of the reel positions in memory 208. In one example, these ranges are stored as a look-up table. In one example, the ranges are each the same size so that each of the reel strip positions has the same chance of been selected. In other examples, the ranges may be arranged to weight the relative chances of selecting specific reel strip positions. The reel strips may be of different lengths.

At step 450, the processor 204 maps symbols of the nth reel strip to and nth column of symbol display positions based on the mapped reel position and a reference position. In an example, the reference position is the bottom position of the symbol positions of each column of symbol positions. In this example, the selected reel position (and hence the symbol at this position) is mapped to the bottom symbol position of the column. In an example, there are two other symbol positions in the column of symbol positions and hence symbols at two neighboring reel strip positions are also mapped to the symbol positions of the column. Referring to the example reel strips of FIG. 3, if the value returned by the RNG 212 is mapped to reel position 313, then for the first reel strip 321, "Pic 1" symbol 353 is mapped to a bottom symbol position, "10" symbol 352 is mapped to a middle symbol position, and "Pic 2" symbol 351 is mapped to a top symbol position.

At step 460, the processor 460 determines whether symbols have been selected for all of the reel strips, and if not the processor 204 reverts to step 420 and iterates through steps 430, 440 and 450 until it is determined at step 460 that symbols have been selected from all n reel strips and mapped to all n columns of symbol positions after which the symbol selection process ends 470. Different numbers of symbols may be mapped to different numbers of symbol positions.

At step 520, the processor 204 selects background symbols from the background reel strips 741-745. In one example, the processor 204 uses the method of FIG. 4 with the first reel strip entirely composed of blank symbols. In another example, the processor 204 uses a modified version of the method of FIG. 4 which results in the process starting by mapping selected symbols to the second column of symbol positions.

After the symbols of all reel strips have been mapped to symbol positions, at step 525 the processor 204 controls display 240 to display them at the symbol positions with any selected BACKGROUND symbols displayed in conjunction with the foreground symbols.

Figure 8:
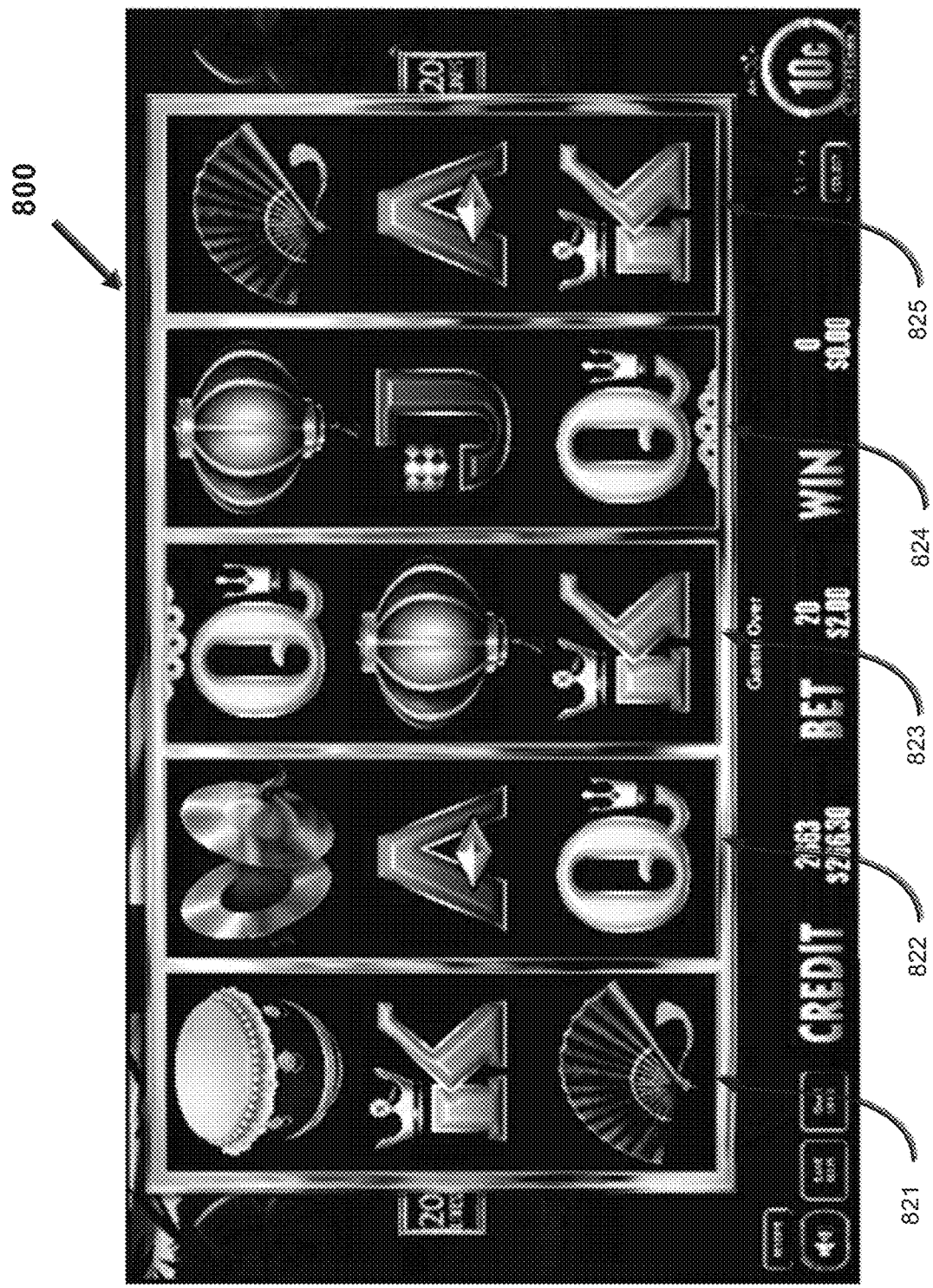
FIGS. 8 to 20 are example screen displays.

FIG. 8 is an example screen display 800 showing a display controlled to display symbols after they have been selected from the first and second sets of reel strips. In this example, the selected symbols are displayed in five columns of symbol positions 821-825. In this example, there are three symbol positions per column, however other numbers of symbol positions and/or columns could be used in other examples. In this example, no BACKGROUND symbols have been selected.

Figure 9:
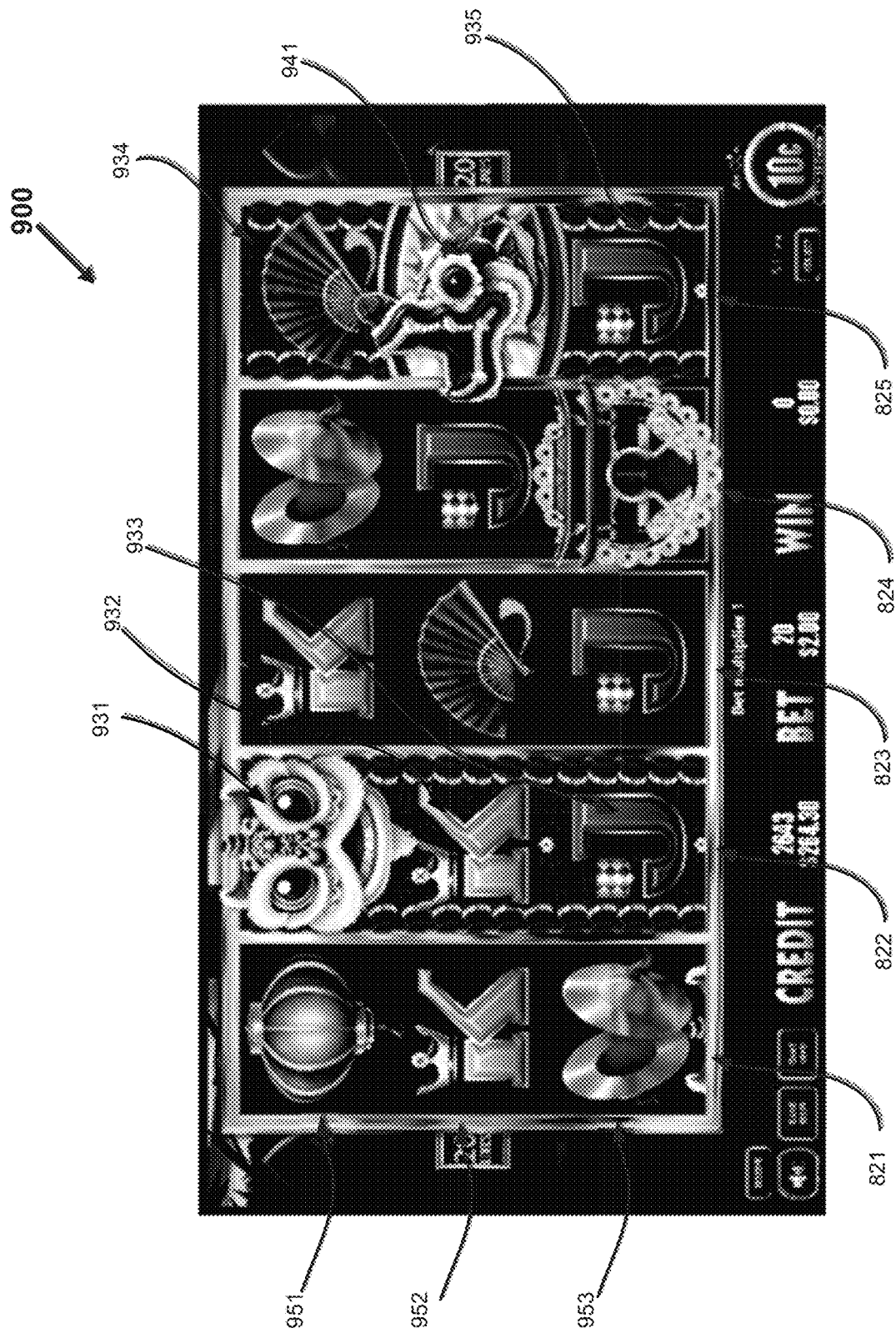

FIG. 9 is a further example screen display 900 showing a display controlled to display symbols after they have been selected from the first and second sets of reel strips. In this example, five BACKGROUND symbols 931-935 have been selected.

At step 530, the processor 204 determines whether the selected symbol include a qualifier symbol and one or more defined symbols. For example, the selected symbols of FIG. 8 would result in a negative evaluation at step 530 and the processor 204 would proceed to step 555 and evaluate the selected symbols for one or more winning symbol combinations based on pay table stored in memory 208.

The processor 204 would then proceed to step 560 and determine whether a trigger event was met for conduct of a feature game. Again, in the case of FIG. 8 this would result in a negative determination and operation of the gaming device to conduct the present game instance would end at step 570.

In addition to showing five BACKGROUND symbols 931-935 being selected, FIG. 9 also shows a QUALIFIER symbol 941 being selected (in this example a DRAGON symbol with an open mouth). In the case of the symbol selection of FIG. 9, the processor 204 will make a positive determination at step 530 and proceed to step 535.

At step 535, the processor 204 selects a symbol replacement mechanism from the background weighted table set at step 510. In one example, there are three replacement mechanisms as shown in Table A

TABLE A

| Replacement Mechanism | Weight |
|---|---|
| Replace with symbol selected from first column of symbol positions | 0.6 |
| Replace with WILD symbols | 0.3 |
| Replace with SPECIAL WILD symbols and select multiplier | 0.1 |

Figure 10:
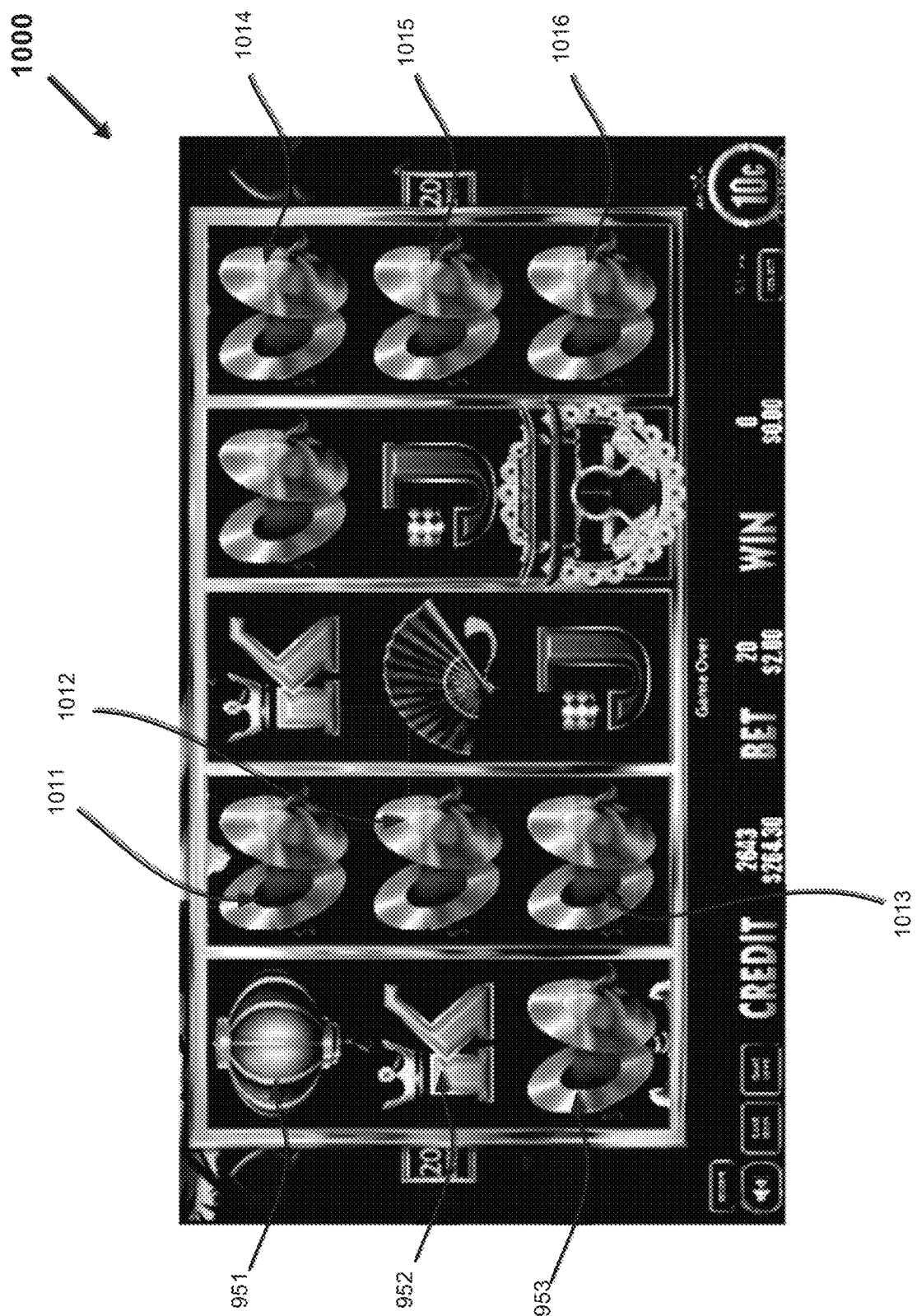

Step 540 controls whether the processor 204 proceeds to step 545 or 550 on the basis of whether or not the selected replacement mechanism is to select a symbol from the first column of display positions. An example where the selected replacement mechanism is to select a symbol from the first column of display positions is shown by the combination of FIGS. 9 and 10. In this respect, in the example of FIG. 9, there are a LANTERN symbol 951, a KING symbol 952 and CYMBALS symbol 953 in the first column 821. At step 545, the processor randomly selects between these symbols, for example, with an even probability of each symbol being selected. In this example, the CYMBALS symbol 953 is selected and at step 550, the processor 204 updates the display to that shown in the example screen display 1000 of FIG. 10, where each of the symbol positions previously occupied by a BACKGROUND symbol 931-935 or a QUALIFIER symbol 941 in FIG. 9 have been updated by the processor 204 to be CYMBALS symbols 1011-1016. After step 550, the processor proceeds to step 555 and evaluates the symbols for winning combinations because there will be a negative determination at step 552 of a need to select a multiplier.

Figure 11:
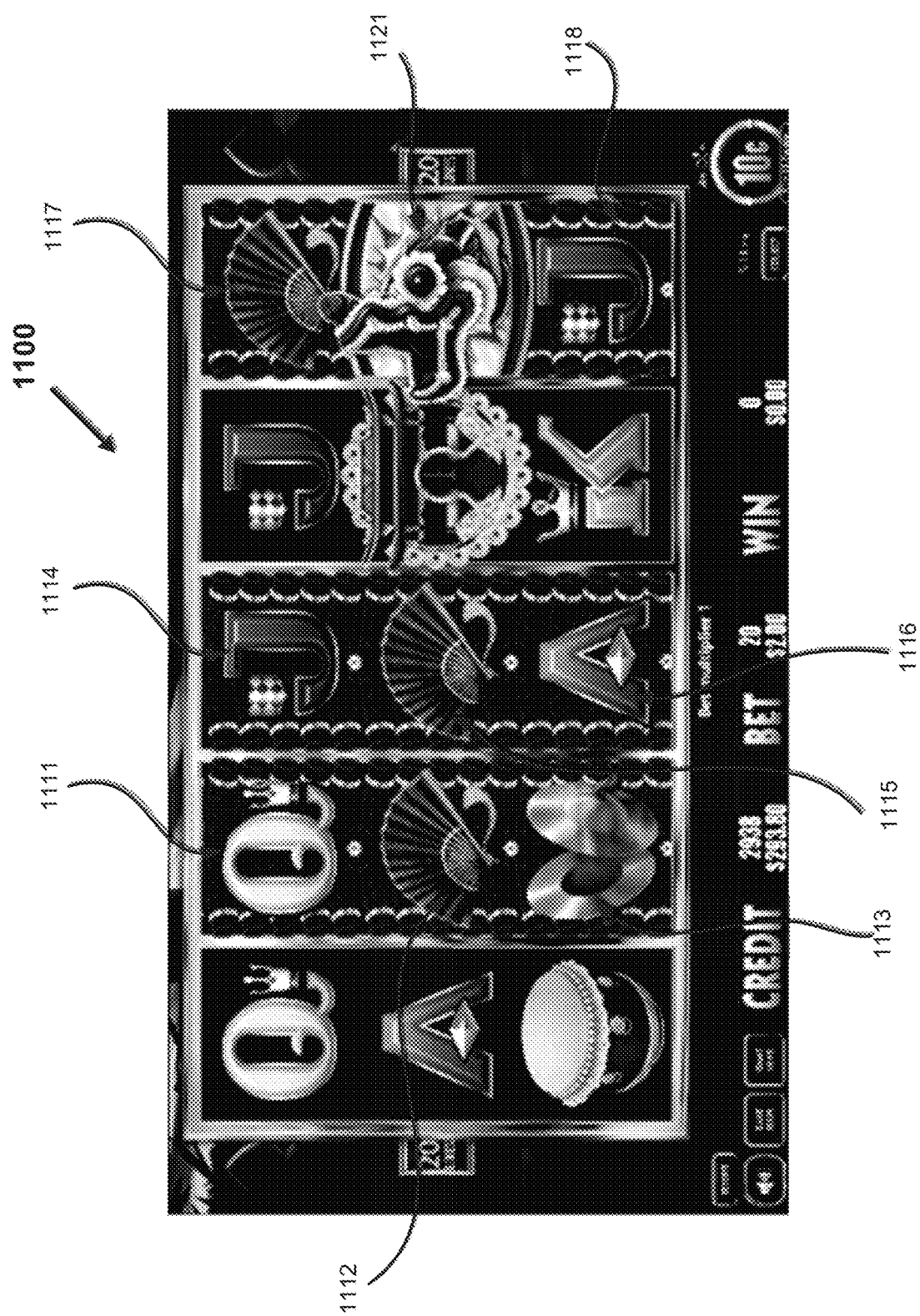
Figure 12:
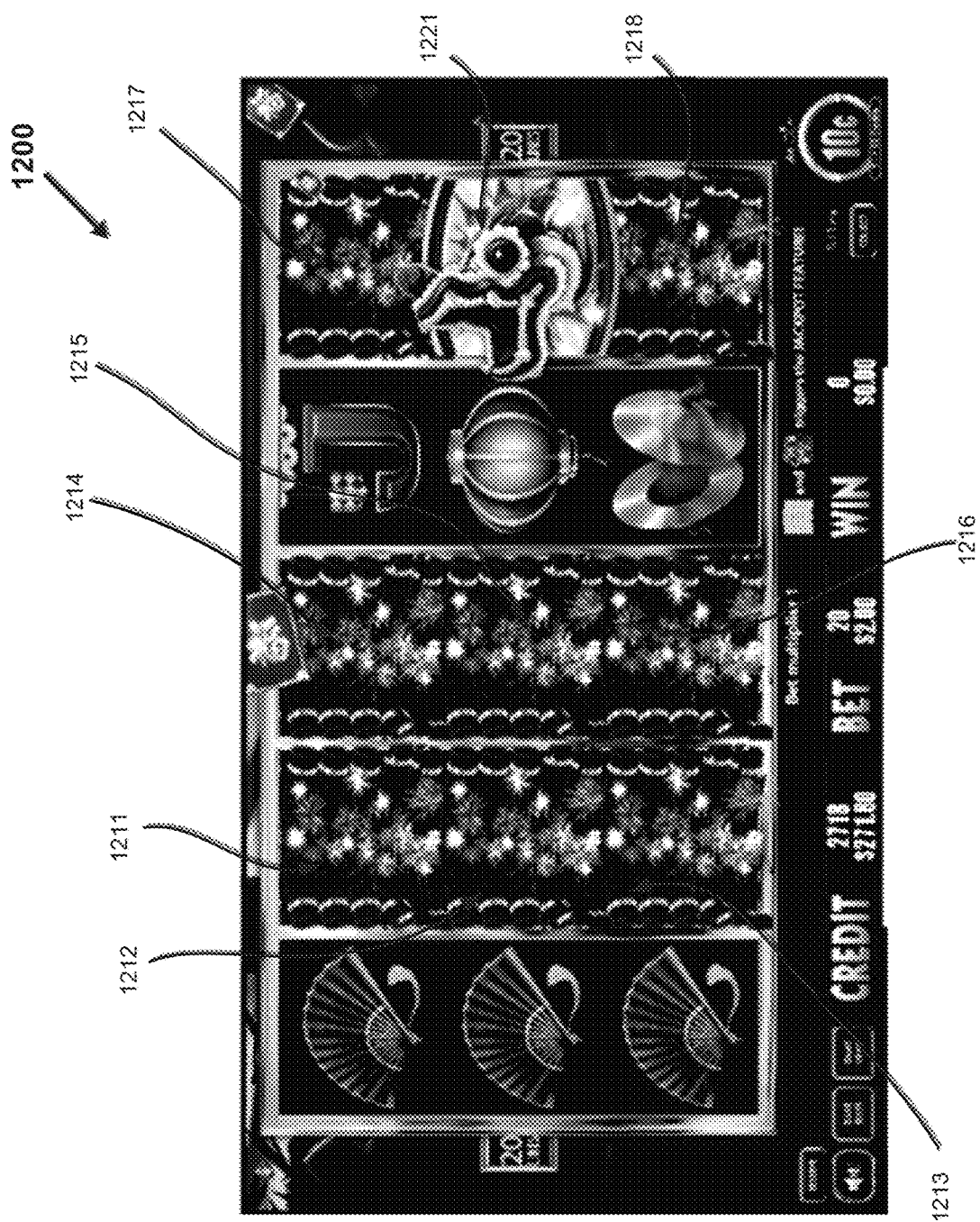
Figure 13:
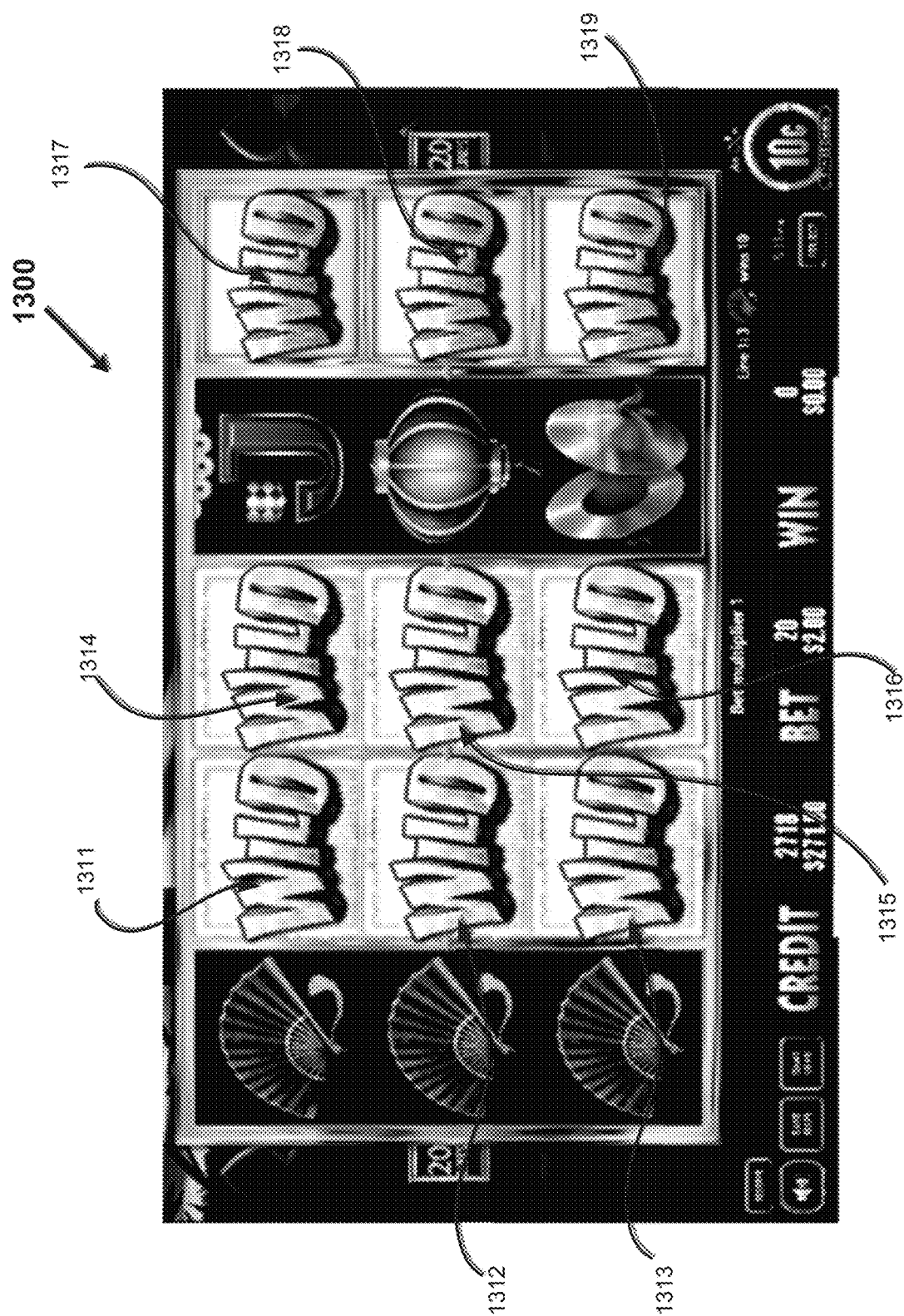

The screen displays 1100, 1200 and 1300 of FIGS. 11-13 illustrate an example of the replacement mechanism, where the symbol selection results in the selection of BACKGROUND symbols 1111-1118 as shown in FIG. 11 such that at step 530, the when processor 204 proceeds to step 535 and in this example, selects the replacement mechanism of replacing with WILD symbols. In this example, processor 204 proceeds to step 550 and updates the display of symbols. In this example, as shown in FIG. 12, the process involves an animation, where the processor removes the selected foreground symbols and animates the BACKGROUND symbols 1211-1218 and QUALIFIER symbol 1221 as exploding. FIG. 13 shows a screen display 1300 following this animation where the symbols have been updated to incorporate the replacement WILD symbols 1311-1319. Processor 204 then proceeds to step 555 and evaluates the symbols for winning combinations based on pay table in memory with WILD symbols substituting in winning combinations.

Figure 14:
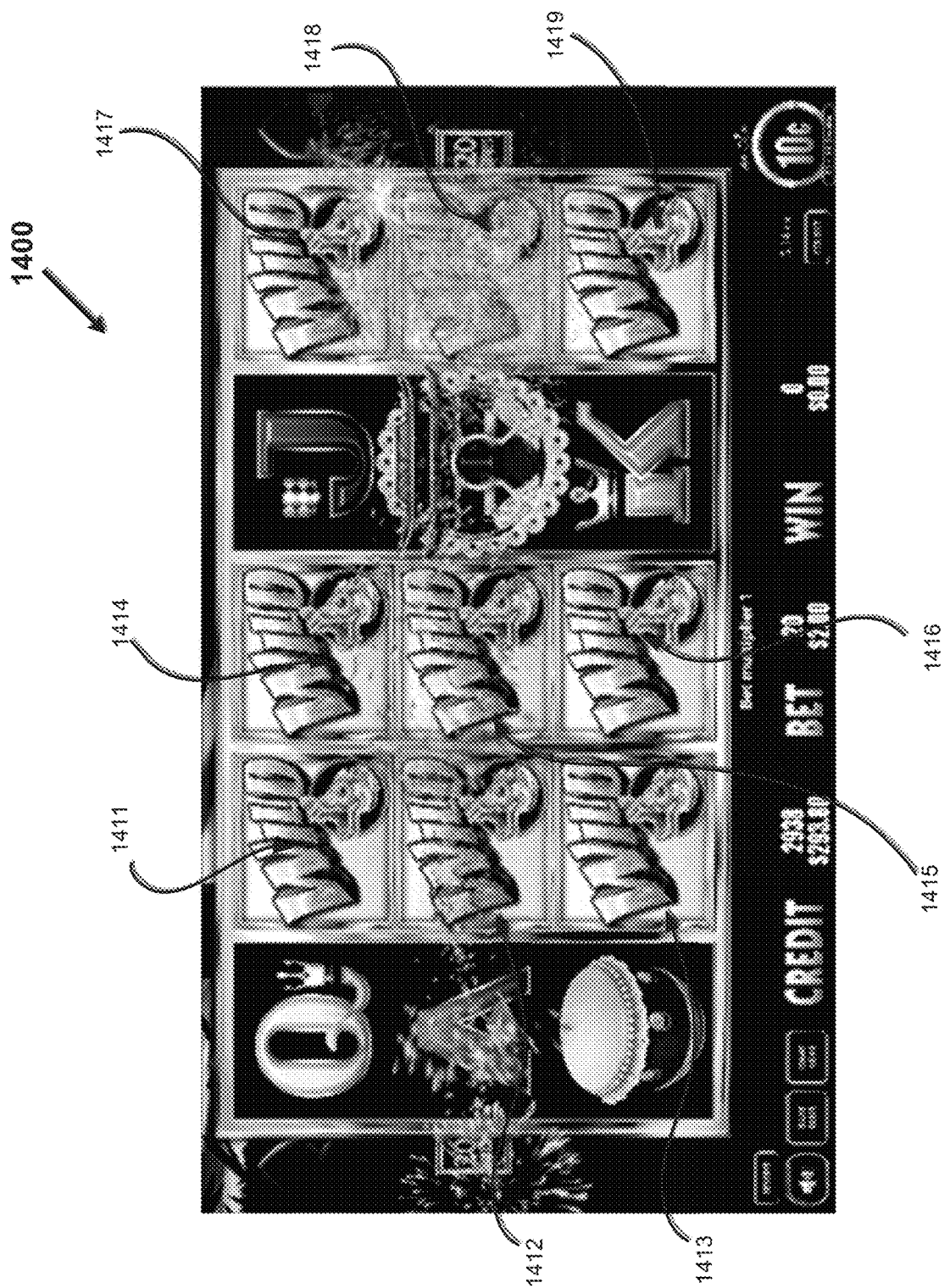
Figure 15:

FIGS. 14 and 15 are example screen displays 1400, 1500 of a case where following the screen display of FIG. 11, the processor 204 randomly selected to replace with SPECIAL WILD symbols and select multiplier replacement mechanism. In this example, after symbols are replaced at step 550, the processor will determine at step 552 that it needs to select a multiplier. In one example, at step 554, the processor 204 uses a weighted table to select between x2, x3, x5, and x10 multipliers. In order to distinguish from displaying normal WILD symbols, in screen display 1400, the processor 204 controls the display to display SPECIAL WILD symbols 1411-1419 in conjunction with an animation of fireworks, with the fireworks most active around SPECIAL WILD symbol 1418 which is at the position formerly occupied by the QUALIFIER symbol. After selecting the multiplier, the processor 204 adds a multiplier indicator to the display as shown in screen display 1500 where there is a x3 multiplier indicator 1510.

It will be apparent that because the above replacement mechanisms result in the replacement symbol being either a symbol from the first column or a wild symbol, there is no need to have a background reel strip for the first column. However, other replacement mechanism, such as replacing symbols with a predefined symbol that does not substitute in winning combinations may require a background reel strip for the first column of symbol positions.

Figure 16:
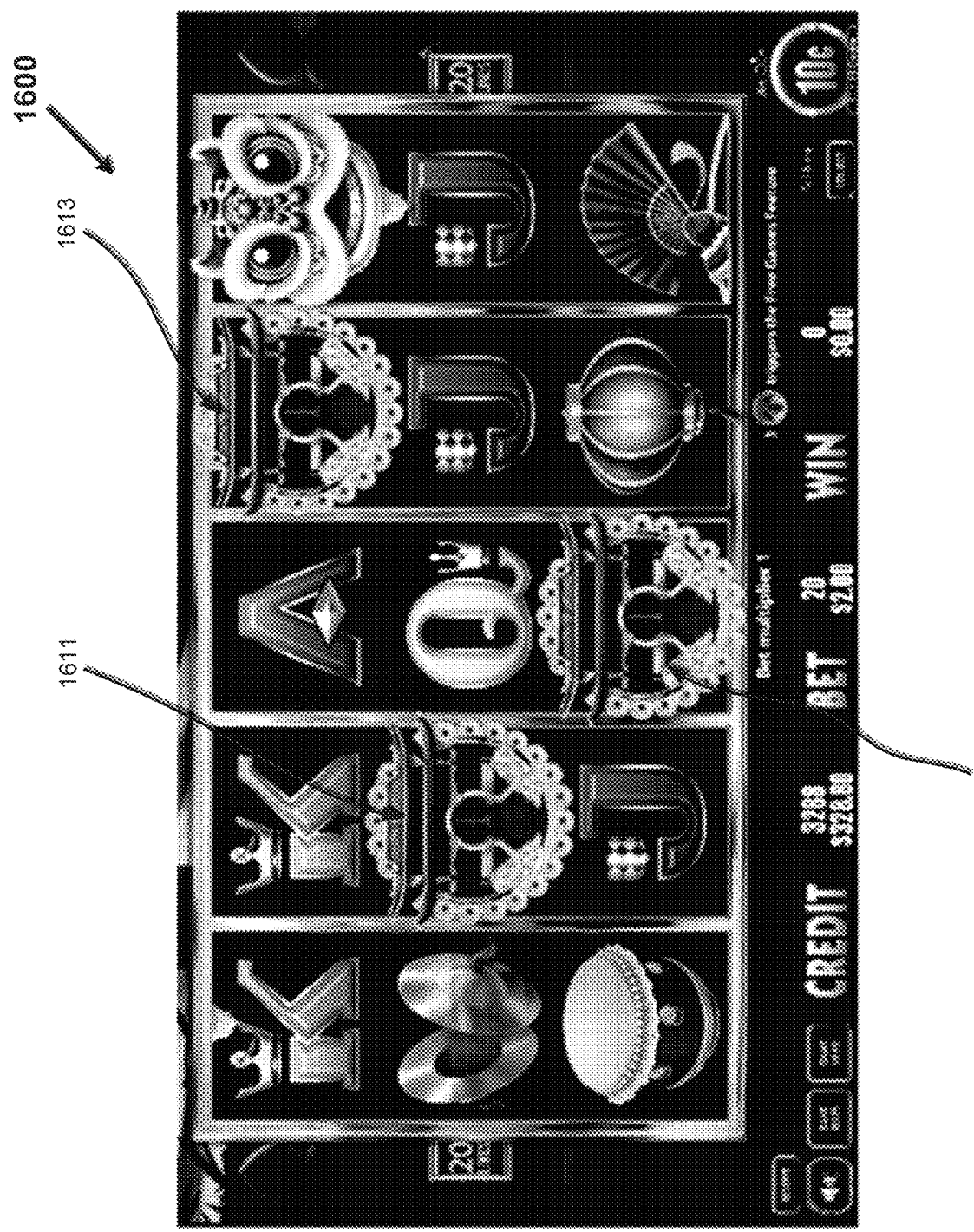

Returning to FIG. 5, at step 560, the processor 204 determines whether a trigger condition is met, for example, the occurrence of three or more SCATTER symbols. FIG. 16 is an example screen display 1600 where the selected symbols include three scatter symbols 1611-1613, Accordingly the symbol selection of FIG. 16 would cause the processor to make a positive determination at step 560 and proceed to step 565 and conduct the feature game.

Figure 6:
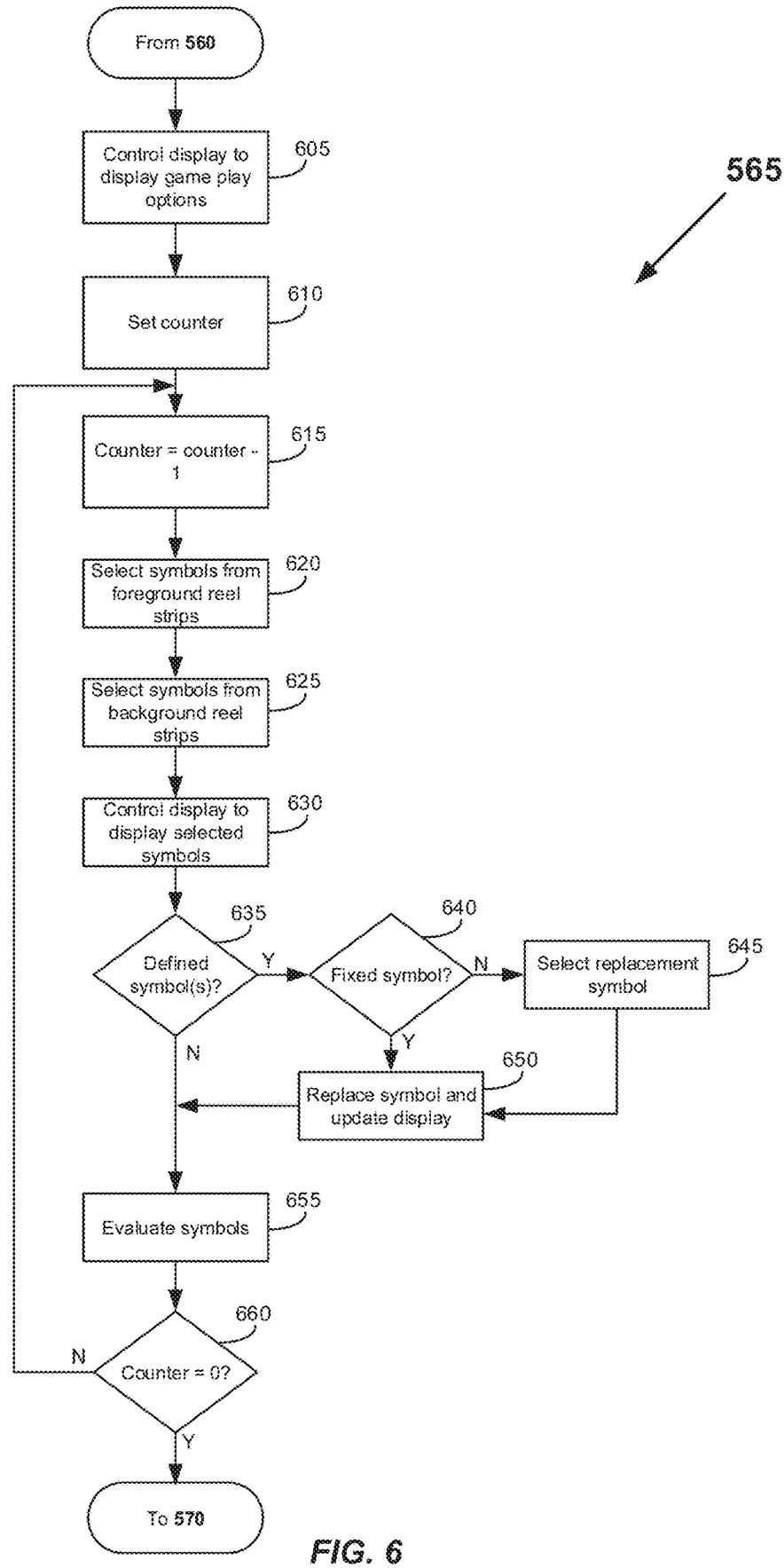
FIG. 6 is a flow chart of a method of operating a gaming device during a feature game.

FIG. 6 is an example method 565 of operating the gaming device to conduct the feature game.

Figure 17:
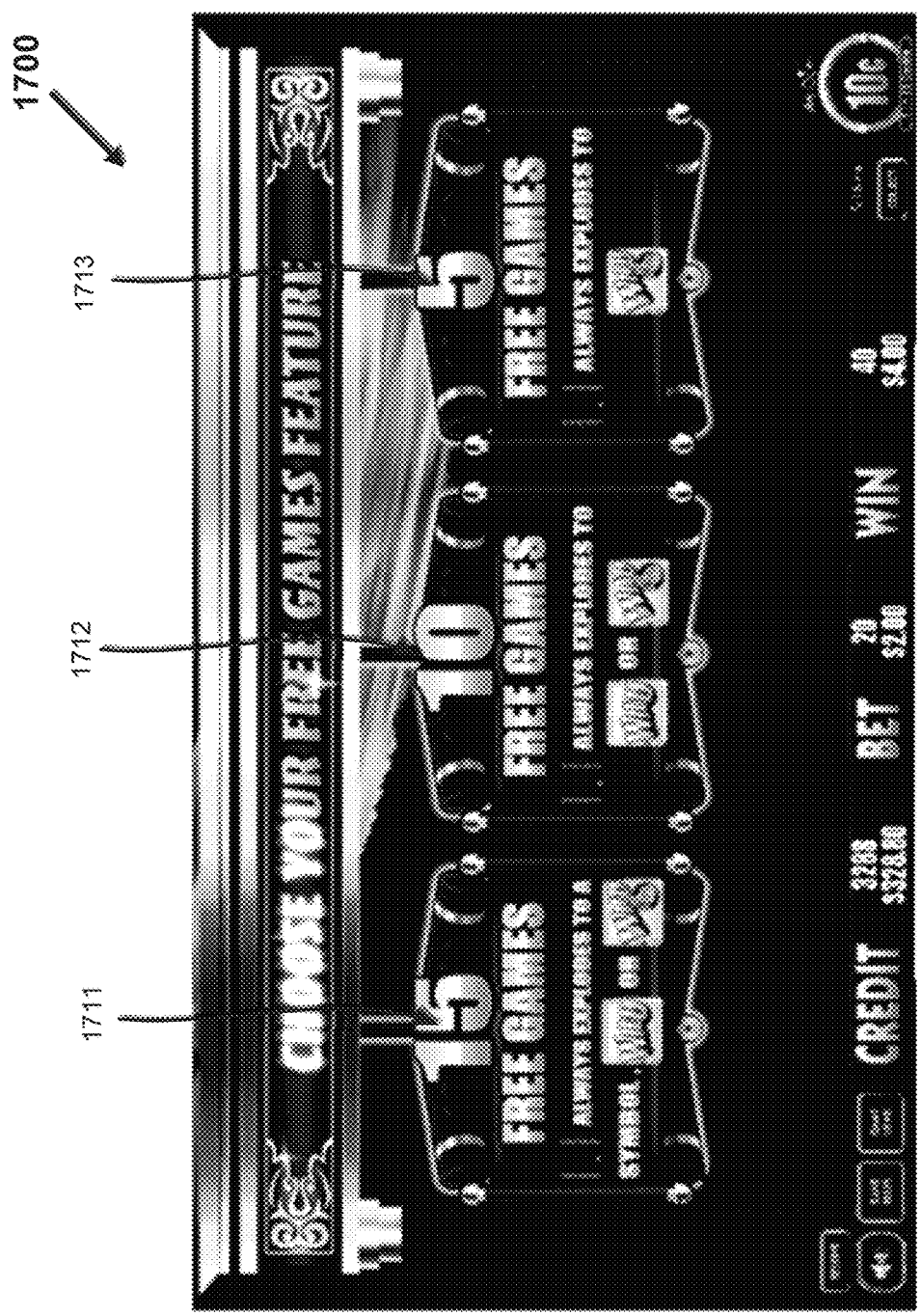

At step 605, the processor 204 controls the display 240 to display a plurality of game play options. An example screen display 1700 is shown in FIG. 17 of an example, where there are three game play options 1711-1713. In this example, each game play option 1711-1713 results in a different number of additional game instances being conducted ("Free Games"). Each game play option is associated with a different variant of a symbol replacement mechanism.

In this example a message associated with the first game play option 1711 indicates that the player will be awarded "15 Free Games. BACKGROUND always explodes to a symbol, WILD or SPECIAL WILD". In this example, the replacement mechanism comprises randomly selecting the first column symbol, WILD or SPECIAL WILD using a first weight table that controls the relative probability of the first column symbol, WILD and SPECIAL WILD being selected.

A message associated with the second game play option 1712 indicates that the player will be awarded "10 Free Games. BACKGROUND always explodes to a WILD or SPECIAL WILD". In this example, the replacement mechanism comprises randomly selecting WILD or SPECIAL WILD using a second weight table that controls the relative probability of WILD and SPECIAL WILD being selected. The second weight table is configured so that there is a higher probability of SPECIAL WILD being selected.

A message associated with the second game play option 1712 indicates that the player will be awarded "5 Free Games. BACKGROUND always explodes to SPECIAL WILD". In this example, the replacement mechanism is fixed—i.e. all BACKGROUND symbols are replaced by SPECIAL WILD.

Figure 18:
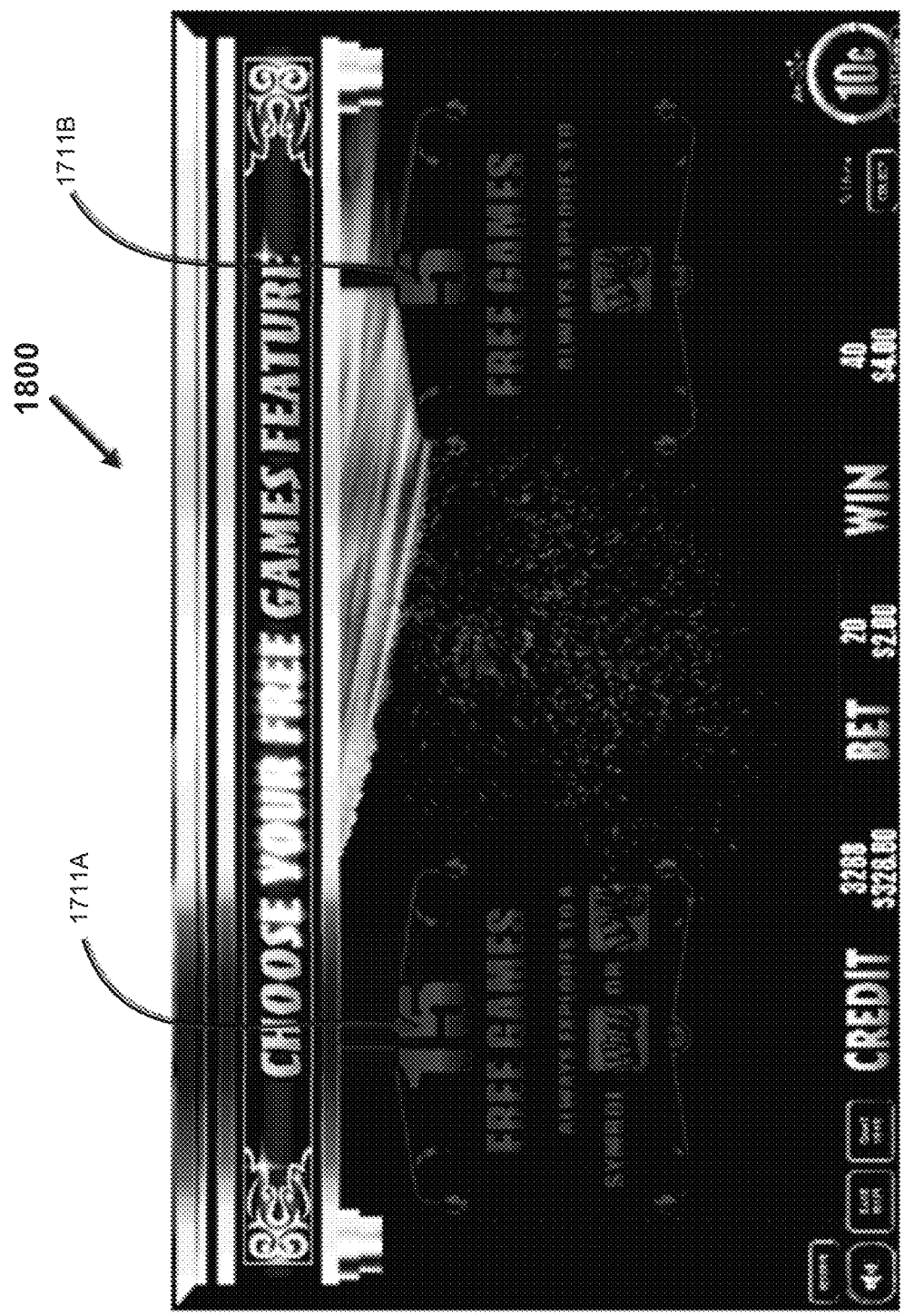

FIG. 18 shows an example screen display 1800 in a case where the second game play option is selected. Screen display 1800 shows that the second game play option is removed from the displayed options to indicate its selection while the unselected options are displayed greyed-out 1711A, 1711B.

At step 610, the processor 204 sets a counter in memory 208 based on the selected option. Accordingly, in a case where the second game play option is selected, the counter is set to ten.

At step 615, the processor 204 begins an iterative loop to conduct the selected number of game instances by decrementing the counter by one.

At step 620, the processor 204 selects symbols for the display positions for the columns of symbol positions from a first, feature game set of foreground reel strips. The foreground reel strips are similar to those of FIG. 3 but for reasons which will become apparent do not include a QUALIFIER symbol.

At step 625, the processor 204 selects symbols for the display positions for the columns of symbol positions from a second, feature game set of background reel strips. The background reel strips are similar to those of FIG. 7.

At step 630, the processor 204 controls display 240 to display the selected symbols at the symbol positions with any selected BACKGROUND symbols displayed in conjunction with the foreground symbols.

At step 635, the processor 204 determines whether the selected symbols include any defined symbols, in this example, the BACKGROUND symbol and if this results in a negative determination, proceeds to step 655 of evaluating the symbols based on a pay table in memory 208. The processor 204 then determines whether the counter has reached zero and if it has, the processor continues to step 570. When the counter has not reached zero, processor 204 iterates through loop 615 to 660 again.

Figure 19:
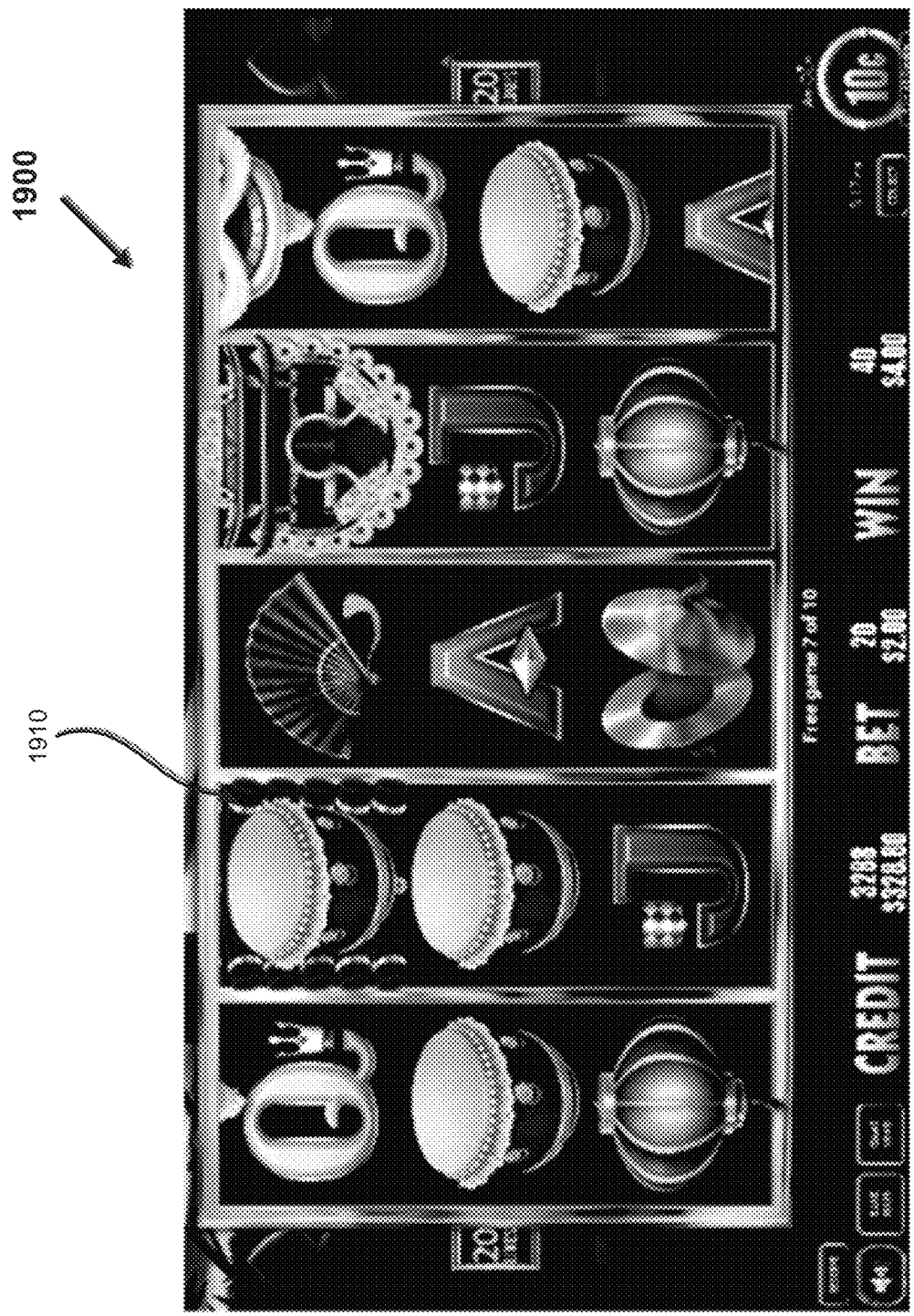

FIG. 19 is an example screen display generated for the second game play option where a single BACKGROUND symbol 1910 is selected. Accordingly, at step 635 this would result in the processor 204 making a positive determination and proceeding to step 640. At step 640, the processor 204 determines whether it is to make a fixed symbol replacement (which would be the case for third game play option 1713) and as a result in this example, the processor 204 makes a negative determination and proceeds to step 645 where the processor 204 randomly selects a replacement symbol from the weighted table in memory 208 corresponding to the second game play option.

Figure 20:
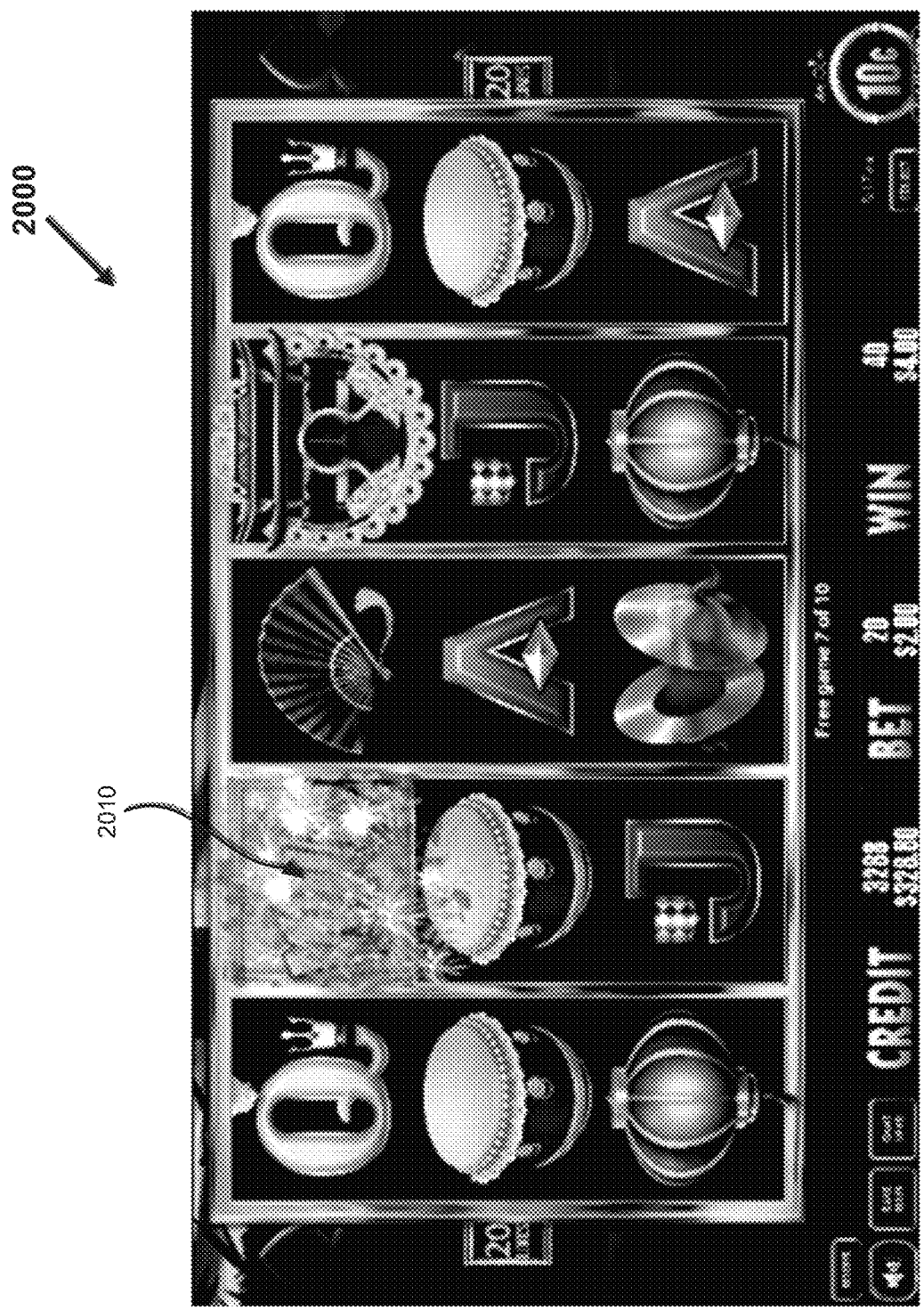

At step 650, the processor 204 updates the display with the selected symbols. FIG. 20 is an example screen display 2000 where the result of step 645 is the selection of a WILD symbol 2010. Processor 204 then proceeds to step 655 and evaluates the updated display of symbols.

It will be apparent from the above that triggering factor that influences the replacement symbol is the selected game play option and also that the qualifier symbol is not needed in this example to trigger replacement of the background symbols.

Example Embodiments

In an example embodiment there is provided a gaming device comprising: a display; a processor; and a memory storing reel strip data defining a plurality of reel strips and instructions which when executed cause the processor to: select symbols from a first set of reel strips defined by said reel strip data for respective ones of a plurality of columns of symbol positions, the first set of reel strips including at least one reel strip comprising a qualifier symbol; select symbols from a second set of reel strips defined by said reel strip data for at least subset of the plurality of columns of symbol positions, the second set of reel strips each comprising defined symbols at a subset of reel strip positions of the respective reel strip; control the display to display the selected symbols of the first and second sets of reel strips at the plurality of columns of symbol positions including by displaying, at each symbol position for which a defined symbol is selected, the defined symbol in conjunction with the symbol selected for the respective symbol position from the first set of reel strips; upon the symbols selected from the first set of reel strips including the qualifier symbol, randomly select, from a set of replacement symbols, a replacement symbol for each symbol position for which the qualifier symbol or the defined symbol was selected; control the display to update the display of symbols in the plurality of columns of symbol positions to incorporate each replacement symbol; evaluate the updated display of symbols for winning symbol combinations.

In an example, the set of replacement symbols includes predefined replacement symbols.

In another example, the set of replacement symbols depends, at least in part, upon symbol selected from the first set of reel strips, for example, upon the symbols selected for a first column of symbol positions.

In another example embodiment there is provided a method of operating a gaming device comprising a display and a memory storing reel strip data defining a plurality of reel strips, the method comprising: selecting symbols from a first set of reel strips defined by said reel strip data for respective ones of a plurality of columns of symbol positions, the first set of reel strips including at least one reel strip comprising a qualifier symbol; selecting symbols from a second set of reel strips defined by said reel strip data for at least subset of the plurality of columns of symbol positions, the second set of reel strips each comprising defined symbols at a subset of reel strip positions of the respective reel strip; controlling the display to display the selected symbols of the first and second sets of reel strips at the plurality of columns of symbol positions including by displaying, at each symbol position for which a defined symbol is selected, the defined symbol in conjunction with the symbol selected for the respective symbol position from the first set of reel strips; upon the symbols selected from the first set of reel strips including the qualifier symbol, randomly selecting, from a set of replacement symbols, a replacement symbol for each symbol position for which the qualifier symbol or the defined symbol was selected; controlling the display to update the display of symbols in the plurality of columns of symbol positions to incorporate each replacement symbol; evaluating the updated display of symbols for winning symbol combinations.

In another example embodiment there is provided a system comprising: one or more processors; and at least one memory storing reel strip data defining a plurality of reel strips and instructions which when executed cause the one or more processors to: select symbols from a first set of reel strips defined by said reel strip data for respective ones of a plurality of columns of symbol positions, the first set of reel strips including at least one reel strip comprising a qualifier symbol; select symbols from a second set of reel strips defined by said reel strip data for at least subset of the plurality of columns of symbol positions, the second set of reel strips each comprising defined symbols at a subset of reel strip positions of the respective reel strip; control a display to display the selected symbols of the first and second sets of reel strips at the plurality of columns of symbol positions including by displaying, at each symbol position for which a defined symbol is selected, the defined symbol in conjunction with the symbol selected for the respective symbol position from the first set of reel strips; upon the symbols selected from the first set of reel strips including the qualifier symbol, randomly select, from a set of replacement symbols, a replacement symbol for each symbol position for which the qualifier symbol or the defined symbol was selected; control the display to update the display of symbols in the plurality of columns of symbol positions to incorporate each replacement symbol; evaluate the updated display of symbols for winning symbol combinations.

Another example embodiment provides a gaming device comprising: a display; a processor; and a memory storing reel strip data defining a plurality of reel strips and instructions which when executed cause the processor to: responsive to a trigger condition being met, present a plurality of game play options on the display; receive a selection of a game play option; select symbols from a first set of reel strips defined by said reel strip data for respective ones of a plurality of columns of symbol positions; select symbols from a second set of reel strips defined by said reel strip data for at least subset of the plurality of columns of symbol positions, the second set of reel strips each comprising defined symbols at a subset of reel strip positions of the respective reel strip; control the display to display the selected symbols of the first and second sets of reel strips at the plurality of columns of symbol positions including by displaying, at each symbol position for which a defined symbol is selected, the defined symbol in conjunction with the symbol selected for the respective symbol position from the first set of reel strips; upon the selected symbols including one or more defined symbols, determine a replacement symbol for each symbol position for which a defined symbol was selected based using a replacement mechanism corresponding to the selected game play option; control the display to update the display of symbols at the plurality of symbol positions to incorporate each replacement symbol; and evaluate the updated display of symbols for winning symbol combinations.

In an example, the game play options further define a number of free game instances and symbols are selected and replaced during each of the game instances.

In an example, a replacement mechanism comprises selecting between at least two symbols based on a first weighted table.

In an example, a replacement mechanism comprises selecting between at least two symbols based on a second weighted table.

In an example, a replacement mechanism comprises using a defined symbol as the replacement symbol.

Another example embodiment provides a method of operating a gaming device comprising a display and a memory storing reel strip data defining a plurality of reel strips, the method comprising: responsive to a trigger condition being met, presenting a plurality of game play options on the display; receiving a selection of a game play option; selecting symbols from a first set of reel strips defined by said reel strip data for respective ones of a plurality of columns of symbol positions; selecting symbols from a second set of reel strips defined by said reel strip data for at least subset of the plurality of columns of symbol positions, the second set of reel strips each comprising defined symbols at a subset of reel strip positions of the respective reel strip; controlling the display to display the selected symbols of the first and second sets of reel strips at the plurality of columns of symbol positions including by displaying, at each symbol position for which a defined symbol is selected, the defined symbol in conjunction with the symbol selected for the respective symbol position from the first set of reel strips; upon the selected symbols including one or more defined symbols, determining a replacement symbol for each symbol position for which a defined symbol was selected based using a replacement mechanism corresponding to the selected game play option; controlling the display to update the display of symbols at the plurality of symbol positions to incorporate each replacement symbol; and evaluating the updated display of symbols for winning symbol combinations.

In another example embodiment there is provided a system comprising: one or more processors; and at least one memory storing reel strip data defining a plurality of reel strips and instructions which when executed cause the one or more processors to: responsive to a trigger condition being met, present a plurality of game play options on a display; receive a selection of a game play option; select symbols from a first set of reel strips defined by said reel strip data for respective ones of a plurality of columns of symbol positions; select symbols from a second set of reel strips defined by said reel strip data for at least subset of the plurality of columns of symbol positions, the second set of reel strips each comprising defined symbols at a subset of reel strip positions of the respective reel strip; control the display to display the selected symbols of the first and second sets of reel strips at the plurality of columns of symbol positions including by displaying, at each symbol position for which a defined symbol is selected, the defined symbol in conjunction with the symbol selected for the respective symbol position from the first set of reel strips; upon the selected symbols including one or more defined symbols, determine a replacement symbol for each symbol position for which a defined symbol was selected based using a replacement mechanism corresponding to the selected game play option; control the display to update the display of symbols at the plurality of symbol positions to incorporate each replacement symbol; and evaluate the updated display of symbols for winning symbol combinations.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

What is claimed is:

1. A gaming system for maintaining a return-to-player percentage, the gaming system comprising:
    a server; and
    a client device having a display device, at least one processor, and a memory storing a plurality of instructions, which, when executed, cause the at least one processor to at least:
        receive from the server a configuration of a plurality of background patterns selected randomly from a set of background reel strips and a first weighted table from a plurality of weighted tables controlling the return-to-player percentage based on one or more random numbers generated by a random number generator,
        control the display device to display a first plurality of symbols randomly selected overlaying a second plurality of symbols selected randomly from a set of foreground reel strips based on the one or more random numbers,
        responsive to the first plurality of symbols selected including a qualifier symbol and the second plurality of symbols selected including a predetermined number of defined symbols, control the display device to animate the qualifier symbol and the predetermined number of defined symbols being replaced with a plurality of replacement symbols based on a replacement mechanism selected from the first weighted table satisfying the return-to-player percentage and the one or more random numbers, and
        control the display device to animate an award evaluated based on the first plurality of symbols that have not been replaced and the replacement symbols displayed.

2. The gaming system of claim 1, wherein the plurality of instructions, when executed, further cause the at least one processor to select the plurality of replacement symbols from a first column of symbol positions.

3. The gaming system of claim 1, wherein the plurality of replacement symbols comprise one or more wild symbols.

4. The gaming system of claim 1, wherein the replacement mechanism further comprises additionally animating the qualifier symbol being replaced with one of the plurality of replacement symbols having a multiplier to be applied to the award.

5. The gaming system of claim 1, wherein the first weighted table comprises additional replacement mechanisms having different relative probabilities of being selected.

6. The gaming system of claim 1, wherein the instructions, when executed, further cause the at least one processor to randomly select the first weighted table from the plurality of weighted tables based on the one or more random numbers.

7. The gaming system of claim 1, wherein the predetermined number of defined symbols comprise a plurality of animating background symbols.

8. A method of operating a gaming system to maintain a return-to-player percentage, the gaming system including a server and a client device comprising a display device, a processor, and a memory storing a plurality of instructions, which, when executed, cause the processor to initiate a game, the method comprising:
    configuring a plurality of background patterns from a set of background reel strips and a first weighted table from a plurality of weighted tables for controlling the return-to-player percentage based on one or more random numbers generated by a random number generator;
    animating a plurality of symbols selected from a set of foreground reel strips overlaying the plurality of background patterns configured;
    responsive to the plurality of symbols selected including a qualifier symbol and a predetermined number of defined symbols, selecting a first replacement mechanism among a plurality of replacement mechanisms in the first weighted table to control the return-to-player percentage, the first replacement mechanism specifying a plurality of replacement symbols for replacing the qualifier symbol and the predetermined number of defined symbols;
    animating a replacement of the qualifier symbol and the predetermined number of defined symbols with the plurality of replacement symbols specified by the first replacement mechanism; and
    animating a winning combination evaluated from the plurality of symbols that have not been replaced and the plurality of replacement symbols.

9. The method of claim 8, further comprising selecting the plurality of replacement symbols from a first column of a plurality of columns of symbol positions.

10. The method of claim 8, wherein the plurality of replacement symbols comprise one or more wild symbols.

11. The method of claim 8, further comprising additionally animating the qualifier symbol being replaced with one of the plurality of replacement symbols having a multiplier to be applied to the winning combination.

12. The method of claim 8, wherein the plurality of replacement mechanisms have different relative probabilities of being selected.

13. The method of claim 8, further comprising animating at least one of the plurality of symbols selected, the replacement symbols, and the winning combination responsive to receiving at least one message from the server.

14. The method of claim 8, wherein the predetermined number of defined symbols comprise a plurality of animating background symbols.

15. A non-transitory computer-readable medium with a plurality of instructions thereon for conducting a game on an electronic gaming system having at least one server for maintaining a return-to-player percentage comprising at least one processor, and wherein the instructions, when executed, cause the at least one processor to perform the steps of:
    transmitting to a client device a configuration of a plurality of background patterns selected randomly from a set of background reel strips and a first weighted table from a plurality of weighted tables, controlling the return-to-player percentage based on one or more random numbers generated by a random number generator;

controlling the client device to animate a plurality of background symbols selected from the plurality of background patterns;

controlling the client device to overlay the plurality of background symbols selected with a plurality of foreground symbols selected from a set of foreground reel strips;

responsive to the plurality of foreground symbols selected including a qualifier symbol and the plurality of background symbols selected including a predetermined number of defined symbols, controlling the client device to animate the qualifier symbol and the predetermined number of defined symbols being replaced by a plurality of replacement symbols specified by a first replacement mechanism selected from the first weighted table; and controlling the client device to animate a winning output evaluated from the plurality of foreground symbols selected and the replacement symbols.

16. The non-transitory computer-readable medium of claim 15, wherein the plurality of instructions, when executed, further cause the at least one processor to perform the step of selecting the plurality of replacement symbols from a first column of a plurality of columns of symbol positions.

17. The non-transitory computer-readable medium of claim 15, wherein the plurality of replacement symbols comprise one or more wild symbols.

18. The non-transitory computer-readable medium of claim 15, wherein the first replacement mechanism further comprises additionally controlling the client device to animate the qualifier symbol being replaced with one of the plurality of replacement symbols having a multiplier to be applied to the winning output.

19. The non-transitory computer-readable medium of claim 15, wherein the plurality of instructions, when executed, further cause the at least one processor to perform at least one of the steps of animating the plurality of background symbols, overlaying the plurality of background symbols, animating the plurality of replacement symbols, and animating the winning output by transmitting at least one message to the client device.

20. The non-transitory computer-readable medium of claim 15, wherein the instructions, when executed, further cause the at least one processor to perform the step of randomly selecting the first weighted table from the plurality of weighted tables based on the one or more random numbers.

* * * * *